United States Patent
Balaya et al.

(10) Patent No.: US 12,080,845 B2
(45) Date of Patent: Sep. 3, 2024

(54) NON-FLAMMABLE SODIUM-ION BATTERIES

(71) Applicant: National University of Singapore, Singapore (SG)

(72) Inventors: Palani Balaya, Singapore (SG); Ashish Rudola, Singapore (SG); Kang Du, Singapore (SG); Satyanarayana Reddy Gajjela, Singapore (SG); Lee Lam Markas Law, Singapore (SG)

(73) Assignee: National University of Singapore, Singapore (SG)

( * ) Notice: Subject to any disclaimer, the term of this patent is extended or adjusted under 35 U.S.C. 154(b) by 144 days.

(21) Appl. No.: 16/345,563

(22) PCT Filed: Oct. 26, 2017

(86) PCT No.: PCT/SG2017/050539
§ 371 (c)(1),
(2) Date: Apr. 26, 2019

(87) PCT Pub. No.: WO2018/080399
PCT Pub. Date: May 3, 2018

(65) Prior Publication Data
US 2019/0312299 A1    Oct. 10, 2019

Related U.S. Application Data

(60) Provisional application No. 62/412,893, filed on Oct. 26, 2016.

(51) Int. Cl.
*H01M 10/054* (2010.01)
*H01M 4/485* (2010.01)
(Continued)

(52) U.S. Cl.
CPC ......... *H01M 10/054* (2013.01); *H01M 4/485* (2013.01); *H01M 4/505* (2013.01);
(Continued)

(58) Field of Classification Search
CPC ...... H01M 10/054; H01M 4/525; H01M 4/58; H01M 10/0568; H01M 10/0569; H01M 10/0567; H01M 2300/0028
See application file for complete search history.

(56) References Cited

U.S. PATENT DOCUMENTS 9,287,586 B1    3/2016 Cheng et al.
2014/0038044 A1    2/2014 Vail et al.
(Continued)

FOREIGN PATENT DOCUMENTS

| CN | 104966813 A | * | 10/2015 |
| CN | 105900275 A | | 8/2016 |

(Continued)

OTHER PUBLICATIONS

"The effect of electrolyte on the electrochemical properties of Na/α—NaMnO2 batteries" by Jo et al. Materials Research Bulletin 58 (2014) 74-77.*

(Continued)

*Primary Examiner* — Basia A Ridley
*Assistant Examiner* — Heng M. Chan
(74) *Attorney, Agent, or Firm* — Osha Bergman Watanabe & Burton LLP

(57) ABSTRACT

Disclosed herein is a non-flammable sodium-ion battery having a cathode and an anode and which uses an electrolyte that includes $NaBF_4$ and a glyme solvent, where the battery has an average voltage of from 1.5 V to 6.0 V and has a coulombic efficiency after 5 charge/discharge cycles of at least 90%.

12 Claims, 11 Drawing Sheets

(51) Int. Cl.
| H01M 4/505 | (2010.01) |
| H01M 4/525 | (2010.01) |
| H01M 4/58 | (2010.01) |
| H01M 10/0567 | (2010.01) |
| H01M 10/0568 | (2010.01) |
| H01M 10/0569 | (2010.01) |

(52) U.S. Cl.
CPC .............. *H01M 4/525* (2013.01); *H01M 4/58* (2013.01); *H01M 10/0568* (2013.01); *H01M 10/0569* (2013.01); *H01M 10/0567* (2013.01); *H01M 2300/0028* (2013.01)

(56) References Cited

U.S. PATENT DOCUMENTS

| 2015/0093644 | A1* | 4/2015 | Han | H01M 10/054 252/519.15 |
| 2015/0357630 | A1* | 12/2015 | Lu | C01C 3/12 429/231.5 |
| 2016/0072151 | A1* | 3/2016 | Zhang | H01M 4/5815 429/331 |
| 2016/0301097 | A1* | 10/2016 | Li | H01M 10/052 |
| 2017/0077546 | A1* | 3/2017 | Zhamu | H01M 4/587 |
| 2018/0251681 | A1* | 9/2018 | Zhang | H01M 10/0567 |

FOREIGN PATENT DOCUMENTS

| CN | 107171020 | * | 9/2017 |
| EP | 0317351 | A2 | 5/1989 |
| EP | 2242130 | A1 | 10/2010 |
| EP | 2860800 | A1 | 4/2015 |
| EP | 3048659 | A1 | 7/2016 |
| JP | H03263769 | A | 11/1991 |
| JP | H03291852 | A | 12/1991 |
| WO | 2013187160 | A1 | 12/2013 |
| WO | 2016/137401 | A1 | 9/2016 |
| WO | 2017/180059 | A1 | 10/2017 |

OTHER PUBLICATIONS

International Search Report issued in corresponding International Application No. PCT/SG2017/050539 dated Dec. 22, 2017 (4 pages).
Written Opinion issued in corresponding International Application No. PCT/SG2017/050539 dated Dec. 22, 2017 (6 pages).
Written Opinion issued in corresponding International Application No. PCT/SG2017/050539 dated Jan. 27, 2018 (6 pages).
Written Opinion issued in corresponding International Application No. PCT/SG2017/050539 dated Jan. 31, 2018 (6 pages).
Rudola A. et al., "Monoclinic Sodium Iron Hexacyanoferrate Cathode and Non-Flammable Glyme-Based Electrolyte for Inexpensive Sodium-Ion Batteries", Journal of the Electrochemical Society, Mar. 25, 2017(Mar. 25, 2017), 164 (6) A1098-A1109 (2017) (12 pages).
Jo, In-Ho et al., "The effect of electrolyte on the electrochemical properties of Na/a-NaMnO2 batteries", Materials Research Bulletin, 2014, 58, 74-77 (4 pages).
C. Kim et al., "Long-term cycling stability of porous Sn anode for sodium-ion batteries", Journal of Power Sources, 2016, 317, 153-158 (6 pages).
J. Gordon, "Post Retort, Pre Hydro-treat Upgrading of Shale Oil", Ceramatec, Incorporated, 2012 (41 pages).
J. V. B. Kanth and H. C. Brown, "Improved Procedures for the Generation of Diborane from Sodium Borohydride and Boron Trifluoride" Inorganic Chemistry, 2000, 39, 1795-1802 (8 pages).
A. Rudola et al., "Na2Ti3O7: an intercalation based anode for sodium-ion battery applications+", Journal of Materials Chemistry A, 2013, 1, 2653-2662 (10 pages).
A. Rudola et al., "Introducing a 0.2 V sodium-ion battery anode: The Na2Ti3O7 to Na3—xTi3O7 pathway", Electrochemistry Communications, 2015, 61, 10-13 (4 pages).

B. Jache and P. Adelhelm, "Use of Graphite as a Highly Reversible Electrode with Superior Cycle Life for Sodium-Ion Batteries by Making Use of Co-Intercalation Phenomena", Angewandte Chemie Int. Ed., 2014, 53, 10169-10173 ( 6 pages).
K. Saravanan et al., "The First Report on Excellent Cycling Stability and Superior Rate Capability of Na 3 V 2 (PO 4 ) 3 for Sodium Ion Batteries", Advanced Energy Materials, 2013, 3, 444-450 (7 pages).
H. Kim et al., "Anomalous Jahn-Teller behavior in a manganese-based mixed-phosphate cathode for sodium ion batteries†", Energy & Environmental Science, 2015, 8, 3325-3335 (11 pages).
E. Irisarri et al., "Review-Hard Carbon Negative Electrode Materials for Sodium-Ion Batteries", Journal of the Electrochemical Society, 2015, 162, A2476-A2482 (7 pages).
A. Rudola, et al., "Na2Ti6O13: a potential anode for grid-storage sodium-ion batteries†", Chemical Communications, 2013, 49, 7451-7453 (3 pages).
K. Shen and M. Wagemaker, "Na2+xTi6O13 as Potential Negative Electrode Material for Na-Ion Batteries", Inorganic Chemistry, 2014, 53, 8250-8256 (7 pages).
K. Cao et al., "Na2Ti6O13 Nanorods with Dominant Large Interlayer Spacing Exposed Facet for High-Performance Na-Ion Batteries", Small, 2016, 12, 2991-2997 (7 pages).
Hwang, Jang-Yeon et al. "Sodium-ion batteries: present and future" Chem. Soc. Rev., 2017, 46, 3529 (87 pages).
Extended European Search Report issued in counterpart European Patent Application No. 17863752.6, mailed on Apr. 29, 2020 (11 pages).
Zhu, Z. et al.; "Highly stable and ultrafast electrode reaction of graphite for sodium ion batteries"; Journal of Power Sources, vol. 293; Jun. 5, 2015, pp. 626-634 (9 pages).
Dahbi, M. et al.; "Sodium carboxymethyl cellulose as a potential binder for hard-carbon negative electrodes in sodium-ion batteries"; Electrochemistry Communications; vol. 44; May 4, 2014, pp. 66-69 (4 pages).
Office Action issued in Chinese Application No. 201780080508.9 mailed on Dec. 28, 2021 (14 pages).
Du et al.; "A comprehensive study on the electrolyte, anode and cathode for developing commercial type non-flammable sodium-ion battery;" Energy Storage Materials; vol. 29; Apr. 21, 2020; pp. 287-299 (13 pages).
Du et al.; "Supplementary Information: A comprehensive study on the electrolyte, anode and cathode for developing commercial type non-flammable sodium-ion battery;" Energy Storage Materials; vol. 29; Apr. 21, 2020; pp. 287-299 (13 pages).
Du et al.; "Investigations of Thermal Stability and Solid Electrolyte Interphase on Na2Ti3O7/C as a Non-carbonaceous Anode Material for Sodium Storage Using Non-flammable Ether-based Electrolyte;" American Chemical Society; Mar. 5, 2021 (9 pages).
Du et al.; "Supporting Information: Investigations of Thermal Stability and Solid Electrolyte Interphase on Na2Ti3O7/C as a Non-carbonaceous Anode Material for Sodium Storage Using Non-flammable Ether-based Electrolyte;" American Chemical Society; Mar. 5, 2021 (5 pages).
Rudola et al.; " Monoclinic Sodium Iron Hexacyanoferrate Cathode and Non-Flammable Glyme-Based Electrolyte for Inexpensive Sodium-Ion Batteries;" Journal of the Electrochemical Society; vol. 164; Mar. 25, 2017 (12 pages).
Rudola et al.; "Supplemental Material: Monoclinic Sodium Iron Hexacyanoferrate Cathode and Non-Flammable Glyme-Based Electrolyte for Inexpensive Sodium-Ion Batteries;" Journal of the Electrochemical Society; vol. 164; Mar. 25, 2017 (10 pages).
Office Action issued in corresponding JP Application No. 2019-522260 with English translation dated Oct. 20, 2021 (15 pages).
Subasinghe, L.U. et al.; "A Study on the Capacity Degradation in Na3.2V1.8Zn0.2(PO4)3 Cathode and Hard Carbon Anode Based Sodium-Ion Cells" Journal of the Electrochemical Society; vol. 169; Aug. 8, 2022 (20 pages).
Tripathi, A. et al.; "Developing an O3 type layered oxide cathode and its application in 18650 commercial type Na-ion batteries" Journal of Materials Checmistry A; vol. 7, pp. 25944-25960; 2019 (30 pages).

(56) References Cited

OTHER PUBLICATIONS

Ponrouch, A. et al.; "In search of an optimized electrolyte for Na-ion batteries" Energy & Environmental Science; vol. 5, pp. 8572-8583; Jun. 13, 2012 (12 pages).

* cited by examiner

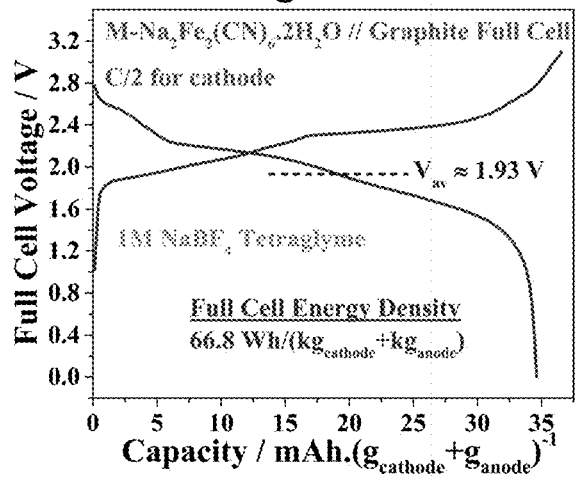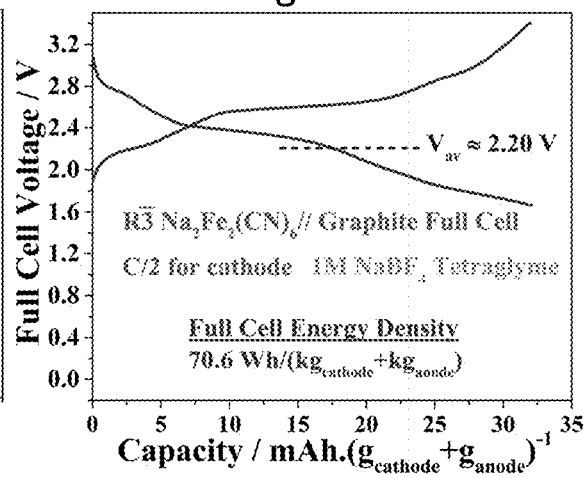
Fig. 7A
Fig. 7B
Fig. 7C

NON-FLAMMABLE SODIUM-ION BATTERIES

FIELD OF INVENTION

The current invention relates to the formation of non-flammable sodium-ion batteries. More particularly, the current invention relates to the use of a glyme-based electrolyte in a sodium-ion battery.

BACKGROUND

The listing or discussion of a prior-published document in this specification should not necessarily be taken as an acknowledgement that the document is part of the state of the art or is common general knowledge.

Energy production and storage technologies are currently an important area of scientific research because of the ever-increasing demand for energy. The mass-adoption of renewable energy sources can help to supply this high demand for energy, while also reducing environmental issues associated with the burning of fossil fuels. However, renewable energy sources tend to produce energy at times when energy demand is low and/or produce energy only intermittently. Therefore, for renewable energy to be more commercially viable there is a need to find ways to store renewable energy so that it can be readily accessed during periods of high demand. Large-scale electrochemical energy storage (EES) devices, or grid-storage batteries, are the most convenient and practically relevant means for storing and releasing the intermittent energy generated from renewable sources. The combined cost of the power plant and its associated storage systems may be the deciding factor on whether renewable energy sources will be chosen over fossil fuels plant in the short-medium term. Apart from a low cost to produce, the most desirable performance metrics for EES batteries are a long cycle life (e.g. a few thousand cycles), a high storage/release efficiency and a high degree of safety. Gravimmetric and volumetric energy densities of such batteries are only a secondary factor, as the footprint and weight are not major concerns.

Sodium-ion batteries (NIBs) are a very attractive option for large-scale EES applications because sodium is over one thousand times more abundant than lithium in the Earth's crust, meaning that as NIBs become more popular, the cost of NIBs is expected to fall dramatically. However, it is imperative that cathodes and anodes in NIBs targeted for grid-storage batteries also use other earth-abundant elemental resources, such as Fe, Mn and Ti in order to minimise the raw-material costs of such batteries. Costs can further be decreased if the electrode materials display air and water stability and can be formed by scalable synthetic processes that use environmentally safe, non-toxic and inexpensive chemicals, which also avoid the need for high temperature calcinations. Furthermore, it is commercially desirable that the NIBs display good thermal and chemical stability at different charge/discharge states at room temperature. The above material and manufacturing choices would ultimately reduce the costs associated with NIB manufacturing, production, maintenance and management processes, which can significantly affect costs over the lifetime of a battery. While these requirements are quite stringent, there have been a few promising NIB electrode materials reported that meet most of the above requirements for grid-storage batteries.

While there have been many efforts directed towards the development of electrode materials for NIBs, comparatively little effort has been spent in looking for an electrolyte to use alongside said electrodes. However, it is clear that a suitable choice of electrolyte is important for making operational NIBs because the electrolyte is the interface between the electrodes and has a direct effect on the performance and safety of the batteries. As such, identifying suitable electrolytes is an indispensable part of developing high performance NIBs. Some important criteria of a good electrolyte are:

(1) high electrochemical stability;
(2) high chemical stability;
(3) high ionic conductivity;
(4) low cost; and
(5) safe to use.

To date, organic electrolyte solutions based on carbonate-ester solvents have mainly been used to develop NIBs. This is because these materials display a large potential window, high ionic conductivity and good temperature performance. Some of the more commonly used carbonate-ester solvents are ethylene carbonate, propylene carbonate and dimethyl carbonate. However, such solvents display one major performance limitation if used with low voltage (operating below 1 V vs Na/Na$^+$) anodes because they significantly reduce at voltages of less than 1 V vs Na/Na$^+$, resulting in very low columbic efficiency. For example, when the promising low-voltage anode $Na_2Ti_3O_7$ is used in the $Na_2Ti_3O_7$ ⇌ $Na_{3-x}Ti_3O_7$ pathway, the first-cycle coulombic efficiency is only around 33% when these carbonate-ester solvents are used. In such a situation, the material costs of the NIB increases significantly, as double or triple the amount of cathode would be consumed in the first-cycle than would be otherwise necessary to offset this low coulombic efficiency if such low-voltage electrodes are used, increasing costs and incurring a significant energy density penalty.

The use of $NaBF_4$ in tetraglyme as an NIB electrolyte, has been reported in half-cell configuration (where a cathode/anode is cycled against Na metal as the counter electrode), by the same research group ((a) I.-H. Jo, et al., *Mater. Res. Bull.*, 2014, 58, 74-77; and (b) C. Kim, et al., *J. Power Sources*, 2016, 317, 153-158). Those publications were limited to a brief discussion of the sodium storage performance of a cathode ($\alpha$-$NaMnO_2$; ref. (a)) and an anode (Sn; ref. (b)) vs Na metal. These publications proved that this electrolyte would not completely decompose at high voltages (till 4.0 V vs Na/Na$^+$) and at low voltages till 0.001 V vs Na/Na$^+$. While this electrolyte is expected to be stable at reducing voltages <1 V vs Na/Na$^+$ (being glyme-based), the major problem with glyme-based electrolytes has been their anodic stability as they tend to decompose at higher voltages. As expected, the $\alpha$-$NaMnO_2$ cathode performance reported up to 4.0 V vs Na/Na$^+$ was unsatisfactory from a coulombic efficiency point of view (a stable coulombic efficiency approaching just 80% was shown over 20 cycles in ref. (a)). This efficiency is unacceptable from a practical viewpoint, as it would lead to a full cell failing in only a handful of cycles, such as 5 or 10, if the coulombic efficiency of its cathode is just 80 or 90% respectively. Indeed, the authors only showed 20 cycles with this electrolyte. Hence, there is no disclosure in these articles to suggest that the use of $NaBF_4$ in tetraglyme will provide a satisfactory performance of an NIB electrode material (cycle life of at least 50 or 100 cycles) at high voltages (>3 V vs Na/Na$^+$).

Moreover, the traditional carbonate-based electrolytes that are currently used in lithium ion batteries (LIBs) and NIBs are highly flammable. This poses serious safety hazards as it could lead to fire or explosion. Thus, there remains a need for NIBs that utilise electrolytes that are non-flammable and can be used compatibly with low voltage anode and high voltage cathode simultaneously to give a higher voltage NIB (average discharge voltage at least above 1.5 V) which shows good performance and high cycle life.

Thus, there remains a need for improved electrolytes for use in NIBs.

SUMMARY OF INVENTION

It has been surprisingly found that a battery which uses an electrolyte comprising NaBF$_4$ and a glyme solvent solves many of the problems. Accordingly, aspects and embodiments of the current invention are provided in the numbered clauses below.

1. A non-flammable sodium-ion battery comprising:
a cathode for a sodium-ion battery;
an anode for a sodium-ion battery;
a separator; and
an electrolyte comprising a salt and a glyme solvent, wherein:
the salt comprises NaBF$_4$;
the battery has an average voltage of from 1.5 V to 6.0 V; and
a coulombic efficiency after 5 charge/discharge cycles of at least 90%.

2. The battery according to Clause 1, wherein the average voltage is from 1.75 to 5.5 V, such as from 2.0 to 5.0 V, such as from 2.5 to 5.0V.

3. The battery according to Clause 1 or Clause 2, wherein the battery has a cycle life of from 50 cycles to 50,000 charge/discharge cycles, such as from 100 to 25,000 cycles, such as from 300 to 10,000 charge/discharge cycles.

4. The battery according to any one of the preceding clauses, wherein the battery has a coulombic efficiency after 5 charge/discharge cycles of at least 95%, such as at least 97%.

5. The battery according to any one of the preceding clauses, wherein the NaBF$_4$ is provided at a concentration of from greater than 0 to less than or equal to 2.5 M in the glyme solvent, such as from 0.5 to less than or equal to 2.5 M in the glyme solvent, such as 1 M.

6. The battery according to any one of the preceding clauses, wherein the glyme solvent is selected from one or more of the group consisting of ethylene glycol dimetheyl ether (monoglyme), diglyme, triglyme, tetraglyme, methyl nonafluorobutyl ether (MFE) and analogues thereof.

7. The battery according to Clause 6, wherein the glyme solvent is tetraglyme.

8. The battery according to any one of the preceding clauses, wherein the glyme solvent further comprises one or more solvents selected from the group consisting of a cyclic carbonate, a linear carbonate, a cyclic ester, a linear ester, a cyclic or linear ether other than a glyme, a nitrile, dioxolane or a derivative thereof, ethylene sulfide, sulfolane, and sultone or a derivative thereof.

9. The battery according to Clause 8, wherein the glyme solvent further comprises one or more of the group selected from propylene carbonate, ethylene carbonate, diethyl carbonate, dimethyl carbonate, ethyl methyl carbonate, tetrahydrofuran, sulfolane, and acetonitrile 10. The battery according to any one of the preceding clauses, wherein the salt further comprises one or more salts selected from the group consisting of NaCN, NaClO$_4$, NaAsF$_6$, NaPF$_6$, NaPF$_{6-x}$(CnF$_{2n+1}$)$_x$ (1<x<6, n=1 or 2), NaSCN, NaBr, NaI, Na$_2$SO$_4$, Na$_2$B$_{10}$Cl$_{10}$, NaCl, NaF, NaPF$_4$, NaOCN, Na(CF$_3$SO$_3$), NaN(CF$_3$SO$_2$)$_2$, NaN (FSO$_2$), NaN(C$_2$F$_5$SO$_2$)$_2$, NaN(CF$_3$SO$_2$)(C$_4$F$_3$SO$_2$), NaC (CF$_3$SO$_2$)$_3$, NaC(C$_2$F$_5$SO$_2$)$_3$, (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n-C$_4$H$_3$)$_4$NClO$_4$, (n-C$_4$H$_9$)$_4$NI, (C$_2$H$_5$)$_4$N-maleate, (C$_2$H$_5$)$_4$N-benzoate, (C$_2$H$_5$)$_4$N-phtalate, sodium stearyl sulfonate, sodium octyl sulfonate, and sodium dodecylbenzene sulfonate.

11. The battery according to Clause 10, wherein the salt further comprises one or more salts selected from the group consisting of NaClO$_4$, NaPF$_6$, NaSCN, NaBr, NaI, NaCl, NaOCN, Na(CF$_3$SO$_3$), NaN(CF$_3$SO$_2$)$_2$, and NaCN.

12. The battery of Clause 10 or Clause 11, wherein each of the one or more salts of Clause 10 or Clause 11, when present, are provided in a concentration of greater than 0 to 2.5 M.

13. The battery according to any one of the preceding clauses, wherein the cathode comprises an active material selected from one or more of the group consisting of Na$_a$[Cu$_b$Fe$_c$Mn$_d$Ni$_e$Ti$_f$M$_g$]O$_2$ (where: 0≤a≤1; 0≤b≤0.3; 0≤c≤0.5; 0≤d≤0.6; 0≤e≤0.3; 0≤f≤0.2; and 0≤g≤0.4, and M is selected from one or more of the group consisting of Mo, Zn, Mg, Cr, Co, Zr, Al, Ca, K, Sr, Li, H, Sn, Te, Sb, Nb, Sc, Rb, Cs, and Na), M-Na$_2$Fe$_2$(CN)$_6$.2H$_2$O; R—Na$_2$Fe$_2$(CN)$_6$, Na$_3$V$_2$(PO$_4$)$_3$ (NVP), and Na$_4$Mn$_3$(PO$_4$)$_2$(P$_2$O$_7$).

14. The battery according to any one of the preceding clauses, wherein the anode comprises an active material selected from one or more of the group consisting of TiO$_2$, or more particularly, Na$_2$Ti$_3$O$_7$⇌Na$_{3-x}$Ti$_3$O$_7$ pathway, Na$_2$Ti$_6$O$_{13}$, graphite, hard carbon, and sodium metal.

15. The battery according to any one of the preceding clauses, wherein the cathode and anode comprise active material pairs selected from the group consisting of: M-Na$_2$Fe$_2$(CN)$_6$.2H$_2$O//TiO$_2$, R—Na$_2$Fe$_2$(CN)$_6$//TiO$_2$, NVP//TiO$_2$, Na$_a$[Cu$_b$Fe$_c$Mn$_d$Ni$_e$Ti$_f$M$_g$]O$_2$//graphite, Na$_a$[Cu$_b$Fe$_c$Mn$_d$Ni$_e$Ti$_f$M$_g$]O$_2$//Na$_2$Ti$_6$O$_{13}$, Na$_a$[Cu$_b$Fe$_c$Mn$_d$Ni$_e$Ti$_f$M$_g$]O$_2$//TiO$_2$, Na$_4$Mn$_3$(PO$_4$)$_2$(P$_2$O$_7$)//TiO$_2$, Na$_a$[Cu$_b$Fe$_c$Mn$_d$Ni$_e$Ti$_f$M$_g$]O$_2$//Na$_2$Ti$_3$O$_7$⇌Na$_{3-x}$Ti$_3$O$_7$ pathway, Na$_a$[Cu$_b$Fe$_c$Mn$_d$Ni$_e$Ti$_f$M$_g$]O$_2$//hard carbon, Na$_a$[Cu$_b$Fe$_c$Mn$_d$Ni$_e$Ti$_f$M$_g$]O$_2$//sodium metal; or more particularly, M-Na$_2$Fe$_2$(CN)$_6$.2H$_2$O//Na$_2$Ti$_3$O$_7$⇌Na$_{3-x}$Ti$_3$O$_7$ pathway; M-Na$_2$Fe$_2$(CN)$_6$.2H$_2$O//Na$_2$Ti$_6$O$_{13}$; M-Na$_2$Fe$_2$(CN)$_6$.2H$_2$O//graphite; M-Na$_2$Fe$_2$(CN)$_6$.2H$_2$O//hard carbon; M-Na$_2$Fe$_2$(CN)$_6$.2H$_2$O//sodium metal; R—Na$_2$Fe$_2$(CN)$_6$//Na$_2$Ti$_3$O$_7$⇌Na$_{3-x}$Ti$_3$O$_7$ pathway; R—Na$_2$Fe$_2$(CN)$_6$//Na$_2$Ti$_6$O$_{13}$; R—Na$_2$Fe$_2$(CN)$_6$//graphite; R—Na$_2$Fe$_2$(CN)$_6$//hard carbon; R—Na$_2$Fe$_2$(CN)$_6$//sodium metal; NVP//Na$_2$Ti$_3$O$_7$⇌Na$_{3-x}$Ti$_3$O$_7$ pathway; NVP//Na$_2$Ti$_6$O$_{13}$; NVP//graphite; NVP//hard carbon; NVP//sodium metal; Na$_4$Mn$_3$(PO$_4$)$_2$(P$_2$O$_7$)//Na$_2$Ti$_3$O$_7$⇌Na$_{3-x}$Ti$_3$O$_7$ pathway; Na$_4$Mn$_3$(PO$_4$)$_2$(P$_2$O$_7$)//Na$_2$Ti$_6$O$_{13}$; Na$_4$Mn$_3$(PO$_4$)$_2$(P$_2$O$_7$)//graphite; Na$_4$Mn$_3$(PO$_4$)$_2$(P$_2$O$_7$)//hard carbon; and Na$_4$Mn$_3$(PO$_4$)$_2$(P$_2$O$_7$)//sodium metal, where (where: 0≤a≤1; 0≤b≤0.3; 0≤c≤0.5; 0≤d≤0.6; 0≤e≤0.3; 0≤f≤0.2; and 0≤g≤0.4, and M is selected from one or more of the group consisting of Mo, Zn, Mg, Cr, Co, Zr, Al, Ca, K, Sr, Li, H, Sn, Te, Sb, Nb, Sc, Rb, Cs, and Na).

16. The battery according to according to Clause 15, wherein the cathode and anode are selected from the group consisting of: M-Na$_2$Fe$_2$(CN)$_6$.2H$_2$O//Na$_2$Ti$_3$O$_7$⇌Na$_{3-x}$Ti$_3$O$_7$ pathway; M-Na$_2$Fe$_2$(CN)$_6$.2H$_2$O//Na$_2$Ti$_6$O$_{13}$; M-Na$_2$Fe$_2$(CN)$_6$.2H$_2$OH//graphite; M-Na$_2$Fe$_2$(CN)$_6$.2H$_2$O//hard carbon; M-Na$_2$Fe$_2$(CN)$_6$.2H$_2$O//sodium metal; R—Na$_2$Fe$_2$(CN)$_6$//Na$_2$Ti$_3$O$_7$⇌Na$_{3-x}$Ti$_3$O$_7$ pathway; R—Na$_2$Fe$_2$(CN)$_6$//Na$_2$Ti$_6$O$_{13}$; R—Na$_2$Fe$_2$(CN)$_6$//graphite; R—Na$_2$Fe$_2$(CN)$_6$//hard carbon; R—Na$_2$Fe$_2$(CN)$_6$//sodium metal; NVP//Na$_2$Ti$_3$O$_7$⇌Na$_{3-x}$Ti$_3$O$_7$ pathway; NVP//Na$_2$Ti$_6$O$_{13}$; NVP//graphite; NVP//hard carbon; NVP//sodium metal; Na$_4$Mn$_3$(PO$_4$)$_2$(P$_2$O$_7$)//Na$_2$Ti$_3$O$_7$⇌Na$_{3-x}$Ti$_3$O$_7$ pathway; Na$_4$Mn$_3$(PO$_4$)$_2$(P$_2$O$_7$)//Na$_2$Ti$_6$O$_{13}$; Na$_4$Mn$_3$ (PO$_4$)$_2$(P$_2$O$_7$)//graphite; Na$_4$Mn$_3$(PO$_4$)$_2$(P$_2$O$_7$)//hard carbon; and Na$_4$Mn$_3$(PO$_4$)$_2$(P$_2$O$_7$)//sodium metal.

17. The battery according to according to Clause 15, wherein the cathode and anode are selected from the group consisting of: M-Na$_2$Fe$_2$(CN)$_6$.2H$_2$O//graphite, M-Na$_2$Fe$_2$(CN)$_6$.2H$_2$O//Na$_2$Ti$_6$O$_{13}$, R—Na$_2$Fe$_2$(CN)$_6$//graphite, R—Na$_2$Fe$_2$(CN)$_6$//Na$_2$Ti$_6$O$_{13}$, NVP//graphite, NVP//Na$_2$Ti$_6$O$_{13}$, M-Na$_2$Fe$_2$(CN)$_6$.2H$_2$O//TiO$_2$, R—Na$_2$Fe$_2$(CN)$_6$//TiO$_2$, NVP//TiO$_2$, Na$_a$[Cu$_b$Fe$_c$Mn$_d$Ni$_e$Ti$_f$M$_g$]O$_2$//graphite, Na$_a$[Cu$_b$Fe$_c$Mn$_d$Ni$_e$Ti$_f$M$_g$]O$_2$//Na$_2$Ti$_6$O$_{13}$, and Na$_a$[Cu$_b$Fe$_c$Mn$_d$Ni$_e$Ti$_f$M$_g$]O$_2$//TiO$_2$.

18. The battery according to according to Clause 17, wherein the cathode and anode are selected from the group consisting of: M-Na$_2$Fe$_2$(CN)$_6$.2H$_2$O//graphite, M-Na$_2$Fe$_2$(CN)$_6$.2H$_2$O//Na$_2$Ti$_6$O$_{13}$, R—Na$_2$Fe$_2$(CN)$_6$//graphite, R—Na$_2$Fe$_2$(CN)$_6$//Na$_2$Ti$_6$O$_{13}$, NVP//graphite, and NVP//Na$_2$Ti$_6$O$_{13}$.

19. The battery according to according to Clause 15, wherein the cathode and anode are selected from the group consisting of: M-Na$_2$Fe$_2$(CN)$_6$.2H$_2$O//Na$_2$Ti$_3$O$_7 \leftrightarrows$ Na$_{3-x}$Ti$_3$O$_7$ pathway, M-Na$_2$Fe$_2$(CN)$_6$.2H$_2$O//hard carbon, M-Na$_2$Fe$_2$(CN)$_6$.2H$_2$O//sodium metal, R—Na$_2$Fe$_2$(CN)$_6$//Na$_2$Ti$_3$O$_7\leftrightarrows$Na$_{3-x}$Ti$_3$O$_7$ pathway, R—Na$_2$Fe$_2$(CN)$_6$//hard carbon, R—Na$_2$Fe$_2$(CN)$_6$//sodium metal, NVP//Na$_2$Ti$_3$O$_7\leftrightarrows$Na$_{3-x}$Ti$_3$O$_7$ pathway, NVP//hard carbon, NVP//sodium metal, Na$_4$Mn$_3$(PO$_4$)$_2$(P$_2$O$_7$)//Na$_2$Ti$_3$O$_7\leftrightarrows$Na$_{3-x}$Ti$_3$O$_7$ pathway, Na$_4$Mn$_3$(PO$_4$)$_2$(P$_2$O$_7$)//NA$_2$Ti$_6$O$_{13}$NA$_4$Mn$_3$(PO$_4$)$_2$(P$_2$O$_7$)//graphite, Na$_4$Mn$_3$(PO$_4$)$_2$(P$_2$O$_7$)//hard carbon, Na$_4$Mn$_3$(PO$_4$)$_2$(P$_2$O$_7$)//sodium metal, Na$_4$Mn$_3$(PO$_4$)$_2$(P$_2$O$_7$)//TiO$_2$, Na$_a$[Cu$_b$Fe$_c$Mn$_d$Ni$_e$Ti$_f$M$_g$]O$_2$//Na$_2$Ti$_3$O$_7\leftrightarrows$Na$_{3-x}$Ti$_3$O$_7$ pathway, Na$_a$[Cu$_b$Fe$_c$Mn$_d$Ni$_e$Ti$_f$M$_g$]O$_2$//hard carbon, and Na$_a$[Cu$_b$Fe$_c$Mn$_d$Ni$_e$Ti$_f$M$_g$]O$_2$//sodium metal.

20. The battery according to according to Clause 19, wherein the cathode and anode are selected from the group consisting of: M-Na$_2$Fe$_2$(CN)$_6$.2H$_2$O//Na$_2$Ti$_3$O$_7 \leftrightarrows$ Na$_{3-x}$Ti$_3$O$_7$ pathway, M-Na$_2$Fe$_2$(CN)$_6$.2H$_2$O//hard carbon, M-Na$_2$Fe$_2$(CN)$_6$.2H$_2$O//sodium metal, R—Na$_2$Fe$_2$(CN)$_6$//Na$_2$Ti$_3$O$_7\leftrightarrows$Na$_{3-x}$Ti$_3$O$_7$ pathway, R—Na$_2$Fe$_2$(CN)$_6$//hard carbon, R—Na$_2$Fe$_2$(CN)$_6$//sodium metal, NVP//Na$_2$Ti$_3$O$_7\leftrightarrows$Na$_{3-x}$Ti$_3$O$_7$ pathway, NVP//hard carbon, NVP//sodium metal, Na$_4$Mn$_3$(PO$_4$)$_2$(P$_2$O$_7$)//Na$_2$Ti$_3$O$_7\leftrightarrows$Na$_{3-x}$Ti$_3$O$_7$ pathway, Na$_4$Mn$_3$(PO$_4$)$_2$(P$_2$O$_7$)//Na$_2$Ti$_6$O$_{13}$Na$_4$Mn$_3$(PO$_4$)$_2$(P$_2$O$_7$)//graphite, Na$_4$Mn$_3$(PO$_4$)$_2$(P$_2$O$_7$)//hard carbon, and Na$_4$Mn$_3$(PO$_4$)$_2$(P$_2$O$_7$)//sodium metal.

21. The battery according to any one of the preceding clauses, wherein the electrolyte further comprises an additive selected from one or more of the group consisting of fluoroethylene carbonate (FEC), vinylene carbonate (VC), vinyl ethylene carbonate (VEC), and adiponitrile.

BRIEF DESCRIPTION OF DRAWINGS

FIG. 3A shows the first galvanostatic cycling at C/2 rate with 1 M NaBF$_4$ in tetraglyme electrolyte in comparison with 1 M NaClO$_4$ in EC-PC electrolyte, with all other experimental conditions being the same; the rate performance of this pathway with (FIG. 3B) the cycling profiles and (FIG. 3C) the charge capacity obtained vs cycle number, at various rates with the discharge at C/5 rate; and (FIG. 3D) Long term cycling over 100 cycles at C/2 rate illustrating the negligible capacity loss for this pathway with the newly proposed electrolyte with a stable coulombic efficiency above 99%.

FIGS. 4A-4C depict sodium storage performance of a graphite electrode vs Na metal in 1 M NaBF$_4$ in tetraglyme electrolyte solution, with: FIG. 4A, the cycling profiles; FIG. 4B, the charge capacity obtained vs cycle number, at various rates with the discharge at C/5 rate (a sodium storage theoretical capacity of 100 mAh/g is assumed for graphite); and FIG. 4C, long term cycling over 200 cycles at C/2 rate demonstrating 100% capacity retention.

FIGS. 5A-5C depict sodium storage performance of M-Na$_2$Fe$_2$(CN)$_6$.2H$_2$O cathode in 1 M NaBF$_4$ in tetraglyme electrolyte solution with: FIG. 5A, the cycling profiles; FIG. 5B, the discharge capacity obtained vs cycle number, at various rates with the charge at C/5 rate; and FIG. 5C, long term cycling of M-Na$_2$Fe$_2$(CN)$_6$.2H$_2$O cathode at 2 C rate again illustrating negligible capacity loss with a stable coulombic efficiency around 99.5%.

FIGS. 6A-6C depict sodium storage performance of R—Na$_2$Fe$_2$(CN)$_6$ cathode in 1 M NaBF$_4$ in tetraglyme electrolyte solution cycled between 3.9-3.0 V vs Na/Na$^+$ with: FIG. 6A, the first cycling profile; FIG. 6B, the tenth cycling profile at 1 C rate; and FIG. 6C, long term cycling of R—Na$_2$Fe$_2$(CN)$_6$ cathode at 1 C rate showing good capacity retention over 200 cycles with a stable coulombic efficiency above 99%.

FIGS. 7A-7C depict representative C/2 cycling of a full cell with graphite as the anode, 1 M NaBF$_4$ in tetraglyme as the electrolyte and FIG. 7A, M-Na$_2$Fe$_2$(CN)$_6$.2H$_2$O as the cathode; and FIG. 7B, R—Na$_2$Fe$_2$(CN)$_6$ as the cathode cycled within its upper charge-discharge plateaus. FIG. 7C depicts the long term cycling of both these full cells over 300 cycles demonstrating the efficacy of these two types of NIBs.

(FIG. 8A) representative C/2 cycling of a R—Na$_2$Fe$_2$(CN)$_6$//Na$_2$Ti$_3$O$_7\leftrightarrows$Na$_{3-x}$Ti$_3$O$_7$ full cell with 1 M NaBF$_4$ in tetraglyme as the electrolyte and with the cathode cycled within its upper charge-discharge plateaus; and FIG. 8B, long term cycling of this full cell over 40 cycles.

(FIG. 9A) cycling profiles of a Na$_{0.9}$[Cu$_{0.22}$Fe$_{0.30}$Mn$_{0.48}$]O$_2$ half-cell in 1 M NaBF$_4$ in tetraglyme electrolyte at C/5 rate; and FIG. 9B, the coulombic efficiency and discharge capacity of the half-cell over 150 cycles. FIG. 9C depicts cycling profiles of a Na$_{0.9}$[Cu$_{0.12}$Ni$_{0.10}$Fe$_{0.30}$Mn$_{0.43}$Ti$_{0.05}$]O$_2$ half-cell in 1 M NaBF$_4$ in tetraglyme electrolyte at C/5 rate, while FIG. 9D depicts the coulombic efficiency and discharge capacity of the half-cell over 50 cycles.

(FIG. 10A) a comparison of the 1st cycle coulombic efficiency of a hard carbon half-cell at C/20 rate in 1 M NaBF$_4$ in tetraglyme and in 1 M NaClO$_4$ in EC-PC (1:1 v/v) electrolytes; and FIG. 10B, coloumbic efficiency and charge capacity of the hard carbon half-cell in the two types of electrolytes over 30 cycles.

(FIG. 12A) a representative cycling profile of a Na$_{0.9}$[Cu$_{0.12}$Ni$_{0.10}$Fe$_{0.30}$Mn$_{0.43}$Ti$_{0.05}$]

O$_2$//hard carbon full cell using 1 M NaBF$_4$ in tetraglyme electrolyte at C/8.5 rate; and FIG. 12B, coulombic efficiency and discharge capacity of the full cell over 10 cycles.

FIG. 13a, 1 M NaBF$_4$ in tetraglyme; FIG. 13B, commercially available 1 M NaPF$_6$ in EC-DMC; and FIG. 13C, 0.6 M NaPF$_6$ in diglyme. In FIGS. 13A-C, "t=0 s" refers to the moment when the open flame first touched the electrolyte solutions. For the 1 M NaBF$_4$ in tetraglyme electrolyte, the flame as shown is coming from the lighter. FIG. 13D depicts DSC heating curves of various electrolytes in an argon atmosphere, illustrating the superior thermal stability of 1 M NaBF$_4$ in tetraglyme electrolyte solution.

DESCRIPTION

Figure 1:
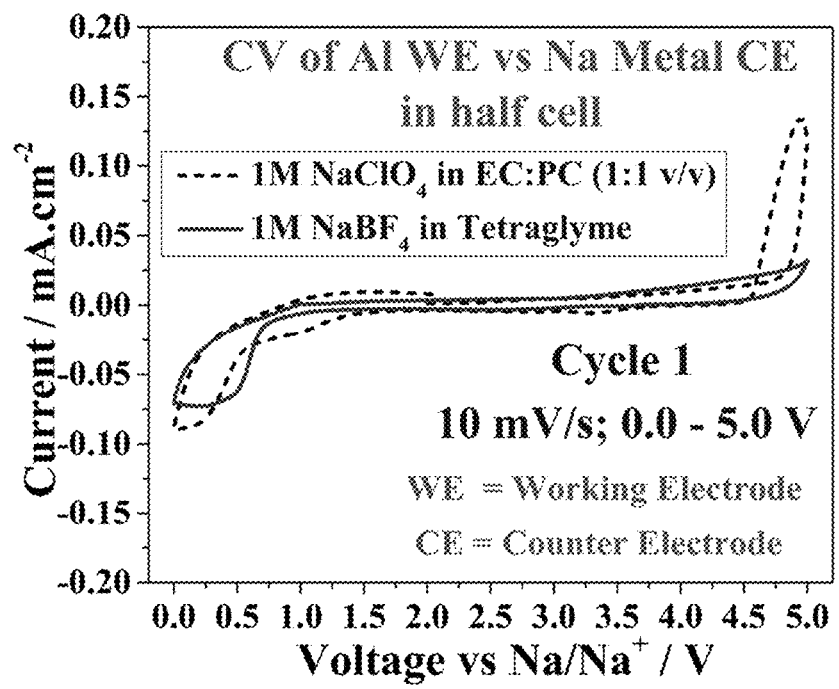
FIG. 1 depicts Cyclic Voltammetry curves of an aluminium working electrode vs a sodium metal disk serving as the counter and reference electrodes in 1 M NaBF$_4$ in tetraglyme and in 1 M NaClO$_4$ in EC-PC.

It has been surprisingly found that the use of a glyme-based electrolyte that includes sodium tetrafluoroborate as a salt provides a non-flammable sodium-ion battery with exceptional cycling and coulombic efficiency properties. As such, there is provided a non-flammable sodium-ion battery comprising:
a cathode for a sodium-ion battery;
an anode for a sodium-ion battery;
a separator; and
an electrolyte comprising a salt and a glyme solvent, wherein :
the salt comprises NaBF$_4$;
the battery has an average voltage of from 1.5 V to 6.0 V; and
a coulombic efficiency after 5 charge/discharge cycles of at least 90%.

In certain embodiments that may be mentioned herein, the cathode does not include α-NaMnO$_2$ as the positive active material and/or the anode does not contain a tin-based material as the negative active material.

It will be appreciated that the sodium-ion battery may be provided in any suitable configuration. Examples of suitable configurations include, but are not limited to, cylindrical cells, prismatic cells, button/coin cells, pouch cells and the like.

Advantages associated with the disclosed batteries are discussed hereinbelow.

The batteries disclosed herein have enhanced safety due to the use of thermally stable non-flammable electrolyte (a glyme solvent, such as tetraglyme). In contrast, current state-of-the-art lithium-ion battery (LIB) and sodium-ion battery (NIB) electrolytes are flammable. This is a serious safety hazard as it could lead (and has in the past led) to explosions. With the specific electrolyte detailed herein, the disclosed NIBs may not catch fire even if exposed to a direct open flame. This is a significant safety advantage.

The NIBs herein can be high voltage NIBs, which results from the wide voltage window of the electrolyte. The NIBs disclosed herein can have discharge plateaus that vary from 1.8 to 3.9 V, owing to the use of different types of cathodes and anodes operating at different potentials. Such flexibility is possible here because the electrolyte performs equally well for very low voltage anodes (<1V vs Na/Na$^+$) as well as (unexpectedly) high voltage cathodes (>3V vs Na/Na$^+$). Most electrolytes for use in a sodium-ion battery do not display such a wide voltage window.

The non-flammable electrolytes disclosed herein have excellent sodium storage performance for NIB cathodes and anodes simultaneously. In other words, the disclosed electrolytes display remarkable performance metrics for low voltage anodes as well as (unexpectedly) for high voltage cathodes in terms of efficiency, rate performance and cycle life, and the resulting batteries outperform existing state-of-the-art NIB electrolytes in these metrics, all while still being safe, non-flammable and inexpensive.

The NIBs disclosed herein are highly efficient, owing to the high coulombic efficiency for high voltage cathodes and, especially, very low voltage anodes with the disclosed electrolyte. NIB electrolyte solvents (for e.g., ethylene carbonate (EC), propylene carbonate (PC), dimethyl carbonate (DMC)) that are currently used reduce at voltages <1V vs Na/Na$^+$, resulting in very low first cycle coulombic efficiency (for example, it is around 33% for the promising NIB anode viz. Na$_2$T$_{i3}$O$_7$ ⇌ Na$_{3-x}$Ti$_3$O$_7$ pathway). This means that more than double or even almost triple the amount of cathode would need to be used in a NIB full cell utilizing such a low voltage anode and the previous state-of-the-art electrolyte (for e.g. NaPF$_6$ in EC:PC or NaClO$_4$ in EC:PC), resulting in a significant energy density penalty. The new electrolyte proposed in this patent shows significantly higher first cycle coulombic efficiency (≈73% for the Na$_2$Ti$_3$O$_7$ ⇌ Na$_{3-x}$Ti$_3$O$_7$ pathway) and almost 100% when a graphite anode is used.

In addition, it is unusual that graphite can be used as an anode because it cannot be used with conventional NIB electrolytes (e.g. NaPF$_6$ in EC:PC or NaPF$_6$ in EC:DMC). However, with this electrolyte disclosed herein, graphite performs very well as a low cost, low voltage, safe, environmentally benign and highly efficient moderate-high capacity NIB anode.

Finally, the cathode and anode active materials used herein are inexpensive and can be manufactured using water-based and scalable syntheses. Furthermore, the electrolyte disclosed herein actually utilizes one of the most inexpensive salt and non-flammable solvent combinations for non-aqueous NIB electrolytes.

When used herein, "average voltage" refers to the weighted average of the voltage when considering the total delivered capacity by the full cell during a discharge cycle. Practically, the average voltage can be computed by calculating the area under the voltage vs specific capacity curve of a discharge cycle (the calculated area will be the specific energy density delivered by the full cell) and then dividing this value with the specific capacity (specific energy density=specific capacity*average voltage).When used herein, "coulombic efficiency", refers to the efficiency with which charge (electrons) is transferred in a system facilitating an electrochemical reaction. In a full cell configuration, the coulombic efficiency is the ratio of the discharge capacity to the charge capacity of the full cell. In a half cell configuration for a cathode, the coulombic efficiency will be the ratio of discharge to charge capacity while the coulombic efficiency for an anode in a half cell configuration will be the ratio of the charge to the discharge capacity.

As noted above, sodium-ion batteries (NIBs) according to the current invention display an average voltage of from 1.5 V to 6.0 V and a coulombic efficiency after 5 charge/discharge cycles of at least 90%. The NIBs disclosed herein may have an average voltage of from 1.75 V to 6.0 V, from 2.0 V to 6.0 V, from 2.5 V to 6.0 V, from 3.0 V to 6.0 V, from 1.5 V to 5.5 V, 1.75 V to 5.5 V, from 2.0 V to 5.5 V, from 2.5 V to 5.5 V, from 3.0 V to 5.5 V, from 2.0 V to 5.0 V, 1.75 V to 5.0 V, from 2.0 V to 5.0 V, from 2.5 V to 5.0 V, from 3.0 V to 5.0 V. In the same or separate embodiments, the coulombic efficiency after 5 charge/discharge cycles may be at least 95%, at least 97% or at least 99%.

When used herein, "cycle life" refers to the cycle number whereby the cell can deliver 20% of the capacities it could deliver in the initial cycles.

The NIBs disclosed herein may have cycle lives of from 50 cycles to 50,000 charge/discharge cycles, such as from 100 cycles to 25,000 charge/discharge cycles, such as 300 cycles to 10,000 charge/discharge cycles. Additional suitable cycle lives may be from 50 to 5,000 charge/discharge cycles, such as from 100 cycles to 4,000 charge/discharge cycles, such as 300 cycles to 3,000 charge/discharge cycles. It will be appreciated that any of the low-end range numbers here (e.g. 50, 100, 300) may be combined with any of the higher range numbers (e.g. 3000, 4000, 5000, 10000, 25000, 50000) to provide additional preferred ranges.

Cathodes of the current invention may comprise a current collector with a layer of the active material thereon, which layer also comprises at least one of a binder and a conductive material (if required) in addition to the active material.

The current collector may be any suitable conductor for a cathode, for example, aluminium (Al), stainless steel, nickel-plated steel, and/or the like.

Active materials that may be used in the cathode include, but are not limited to, $Na_a[Cu_bFe_cMn_dNi_eTi_fM_g]O_2$ (where: $0 \leq a \leq 1$; $0 \leq b \leq 0.3$; $0 \leq c \leq 0.5$; $0 \leq d \leq 0.6$; $0 \leq e \leq 0.3$; $0 \leq f \leq 0.2$; $0 \leq g \leq 0.4$, and M is selected from one or more of the group consisting of Mo, Zn, Mg, Cr, Co, Zr, Al, Ca, K, Sr, Li, H, Sn, Te, Sb, Nb, Sc, Rb, Cs, and Na), or more particularly, $M-Na_2Fe_2(CN)_6 \cdot 2H_2O$; $R-Na_2Fe_2(CN)_6$, NVP, and $Na_4Mn_3(PO_4)_2(P_2O_7)$. It will be appreciated that the above materials may be used individually. That is, a cathode may only contain one of the above active materials. However, it is also possible for a single cathode to contain more than one of the above materials in combination. Any suitable weight ratio may be used when the active materials above are used in combination. For example, the weight ratio for two active materials in a single cathode may range from 1:100 to 100:1, such as from 1:50 to 50:1, for example 1:1. In additional or alternative embodiments, the battery may comprise more than one cathode. When the battery contains more than one cathode (e.g. from two to 10, such as from 2 to 5 cathodes) the active materials may be chosen from those above and each cathode may independently contain only one cathode active material or a combination of two or more active materials as discussed above.

For the $R-Na_2Fe_2(CN)_6$ cathode active material, both its 3.9-2.0 V cycling (two mole sodium storage per mole of $R-Na_2Fe_2(CN)_6$ resulting in 170.85 mAh/g theoretical capacity) and its 3.9-3.0 V cycling are intended to be covered herein by mention of this active material.

When the active material is chosen from the materials covered by the formula $Na_a[Cu_bFe_cMn_dNi_eTi_fM_g]O_2$, it will be appreciated that the values for a-g and M are chosen so as to maintain charge balance. Examples of active materials that fall within the formula $Na_a[Cu_bFe_cMn_dNi_eTi_fM_g]O_2$ that may be mentioned herein include $Na_{0.9}[Cu_{0.22}Fe_{0.30}Mn_{0.48}]O_2$ and $Na_{0.9}[Cu_{0.12}Ni_{0.10}Fe_{0.30}Mn_{0.43}Ti_{0.05}]O_2$.

When $Na_3V_2(PO_4)_3$ (NVP) is used as the positive active material, it may be used as undoped NVP or as doped NVP (e.g. maximum of 10% of dopant(s)), where the dopant(s) may be selected from any suitable metal, such as one or more of the group including, but not limited to, Mg, Zn, Al, and the like. A particular NVP that may be mentioned herein is NVP doped with Zn. It is explicitly contemplated that the above-mentioned undoped NVP and doped NVPs may be used in the cathode and anode active material combinations mentioned herein wherever NVP is mentioned. A particular combination of cathode and anode active materials that may be mentioned is a Zn-doped NVP//hard carbon (e.g. in a tetraglyme-based electrolyte).

The binder improves binding properties of the positive active material particles (e.g. $M-Na_2Fe_2(CN)_6 \cdot 2H_2O$ or $R-Na_2Fe_2(CN)_6$) with one another and the current collector. The binder may be a non-aqueous binder, an aqueous binder, or a combination thereof. The binder is not particularly limited as long as it binds the positive active material and the conductive material on a current collector, and simultaneously (or concurrently) has oxidation resistance for high potential of a cathode and electrolyte stability.

Non-aqueous binders that may be mentioned herein include, but are not limited to, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

Aqueous binders that may be mentioned herein include, but are not limited to, a rubber-based binder or a polymer resin binder. Rubber-based binders may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. Polymer resin binders may be selected from ethylenepropylene copolymer, epichlorohydrin, polyphosphazene, polyacrylonitrile, polystyrene, ethylenepropylenediene copolymer, polyvinylpyridine, chlorosulfonated polyethylene, latex, a polyester resin, an acrylic resin, a phenolic resin, an epoxy resin, polyvinyl alcohol and a combination thereof.

A cellulose-based compound may be used as the binder (or in combination with other materials). Examples of suitable cellulose-based materials includes, but is not limited to, one or more of carboxylmethyl cellulose, hydroxypropylmethyl cellulose, methyl cellulose, or alkali metal salts thereof. The alkali metal may be Na, K, or Li. Such a cellulose-based compound may be included in an amount of about 0.1 parts by weight to about 20 parts by weight based on 100 parts by weight of the active material. A particular cellulose-based binder that may be mentioned herein is the sodium salt of carboxylmethyl cellulose.

The conductive material improves conductivity of an electrode. Any electrically conductive material may be used as a conductive material, unless it causes a chemical change, and examples thereof may be natural graphite, artificial graphite, carbon black, acetylene black, ketjen black, carbon fiber and/or like carbon-based material; copper, nickel, aluminum, silver, and/or like metal powder or metal fiber and/or like metal-based material; polyphenylene derivative and/or like conductive polymer; and/or a mixture thereof.

Cathodes of the current invention may be manufactured using the following method. First, the active material(s), the conductive material, and the binder are mixed in a desirable ratio (e.g. active material(s):additive:binder ratio of from 70:20:10 to 96:2:2, specific ratios that may be mentioned include, but are not limited to 85:10:5 and 90:5:5) and dispersed in an aqueous solution and/or an organic solvent (such as N-methyl-2-pyrrolidone) to form a slurry. Additionally or alternatively, the amount of active substance in the cathodes may be from 70 to 96 wt %, the amount of additive (e.g. conductive carbon) may be from 2 to 20 wt % and the amount of binder may also be from 2 to 10 wt %. Subsequently, the slurry is coated on a current collector and then dried to form an active material layer. Herein, the coating method is not particularly limited, and may be, for example, a knife coating method (e.g. Doctor knife coating), a gravure coating method, and/or the like. Then, the active material layer is compressed utilizing a compressor (such as a roll press) to a desirable thickness to manufacture an electrode. A thickness of the active material layer is not particularly limited, and may be any suitable thickness that is applicable to a positive active material layer of a rechargeable lithium or sodium battery. The active material loading may be from 1 to 50 mg cm$^{-2}$, for example the active material loading may be from 5 to 40 mg cm$^{-2}$, such as from 8 to 30 mg cm$^{-2}$.

The anode may be formed in similar manner to that described herein before. That is the anode may include a negative active material, and may further include a binder and a conductive additive.

The negative active material layer may be any suitable negative active material layer for a full cell battery (e.g. a NIB). For example, the negative active material may include a carbon-based material, a silicon-based material, a tin-based material, an antimony-based material, a lead-based material, a metal oxide (e.g. a lithium or sodium metal oxide), a sodium metal, and/or the like, which may be utilized singularly or as a mixture of two or more. The carbon-based material may be, for example, soft carbon or hard carbon or a graphite-based material such as artificial graphite, natural graphite, a mixture of artificial graphite and natural graphite, natural graphite coated with artificial graphite, and/or the like. The silicon-based material may be, for example, silicon, a silicon oxide, a silicon-containing alloy, a mixture of the graphite-based material with the foregoing materials, and/or the like. The silicon oxide may be represented by $SiO_x$ ($0<x\leq2$). The silicon-containing alloy may be an alloy including silicon in the largest amount of the total metal elements (e.g., silicon being the metal element that is present in the largest amount of all the metal elements) based on the total amount of the alloy, for example, a Si—Al—Fe alloy. The tin-based material may be, for example, tin, a tin oxide, a tin-containing alloy, a mixture of the graphite-based material with the foregoing materials, and/or the like. Likewise for antimony and lead-based materials. The lithium metal oxide may be, for example, a titanium oxide compound such as $Li_4Ti_5O_{12}$, $Li_2Ti_6O_{13}$ or $Li_2Ti_3O_7$. The sodium metal oxide may be, for example, a titanium oxide compound such as $Na_2Ti_3O_7$ or $Na_2Ti_6O_{13}$. Other metal oxides that may be mentioned herein as suitable include, but are not limited to, $TiO_2$, $Fe_2O_3$, $MoO_3$. According to one embodiment, among them, graphite may further improve cycle-life characteristics of a NIB. In certain embodiments mentioned herein, the negative active material is not a tin-based material.

It will be appreciated that the above negative active materials may be used individually. That is, an anode may only contain one of the above negative active materials. However, it is also possible for a single anode to contain more than one of the above materials in combination. Any suitable weight ratio may be used when the active materials above are used in combination. For example, the weight ratio for two active materials in a single anode may range from 1:100 to 100:1, such as from 1:50 to 50:1, for example 1:1. In additional or alternative embodiments, the battery may comprise more than one anode. When the battery contains more than one anode (e.g. from two to 10, such as from 2 to 5 cathodes) the active materials may be chosen from those above and each anode may independently contain only one anode active material or a combination of two or more active materials as discussed above.

More particularly, the negative active materials may be selected from the group consisting of $TiO_2$, or, yet more particularly, $Na_2Ti_3O_7 \leftrightarrows Na_{3-x}Ti_3O_7$ pathway, $Na_2Ti_6O_{13}$, graphite, hard carbon, and sodium metal.

The binder and conductive additive (if any) are not particularly limited, and may be the same binder and conductive additive as that of the cathode.

A weight ratio of the negative active material and the binder is not particularly limited, and may be a weight ratio of a related art NIB.

The anode may be manufactured as follows. The negative active material(s), conductive additive (if required) and the binder are mixed in a desired ratio and the mixture is dispersed in an appropriate solvent (such as water and/or the like) to prepare a slurry. Then, the slurry is applied on a current collector and dried to form a negative active material layer. Then, the negative active material layer is compressed to have a desired thickness by utilizing a compressor, thereby manufacturing the anode. Herein, the negative active material layer has no particularly limited thickness, but may have any suitable thickness that a negative active material layer for a rechargeable lithium (or sodium) ion battery may have. In addition, when metal sodium is utilized as the negative active material layer, the metal sodium may be overlapped with (e.g., laminated or coated on) the current collector.

As will be appreciated, the above cathode and anode active materials may be paired together to provide cathode and anode active material pairs. As such, the battery disclosed herein may have a cathode and anode comprise active material pairs selected from the group consisting of: $M-Na_2Fe_2(CN)_6\cdot2H_2O//TiO_2$, $R-Na_2Fe_2(CN)_6//TiO_2$, $NVP//TiO_2$, $Na_a[Cu_bFe_cMn_dNi_eTi_fM_g]O_2//$graphite, $Na_a[Cu_bFe_cMn_dNi_eTi_fM_g]O_2//Na_2Ti_6O_{13}$, $Na_a[Cu_bFe_cMn_dNi_eTi_fM_g]O_2//TiO_2$, $Na_4Mn_3(PO_4)_2(P_2O_7)//TiO_2$, $Na_a[Cu_bFe_cMn_dNi_eTi_fM_g]O_2//Na_2Ti_3O_7 \leftrightarrows Na_{3-x}Ti_3O_7$ pathway, $Na_a[Cu_bFe_cMn_dNi_eTi_fM_g]O_2//$hard carbon, $Na_a[Cu_bFe_cMn_dNi_eTi_fM_g]O_2//$sodium metal, $M-Na_2Fe_2(CN)_6\cdot2H_2O//Na_2Ti_3O_7 \leftrightarrows Na_{3-x}Ti_3O_7$ pathway; $M-Na_2Fe_2(CN)_6\cdot2H_2O//Na_2Ti_6O_{13}$; $M-Na_2Fe_2(CN)_6\cdot2H_2O//$graphite; $M-Na_2Fe_2(CN)_6\cdot2H_2O//$hard carbon; $M-Na_2Fe_2(CN)_6\cdot2H_2O//$sodium metal; $R-Na_2Fe_2(CN)_6//Na_2Ti_3O_7 \leftrightarrows Na_{3-x}Ti_3O_7$ pathway; $R-Na_2Fe_2(CN)_6//Na_2Ti_6O_{13}$; $R-Na_2Fe_2(CN)_6//$graphite; $R-Na_2Fe_2(CN)_6//$hard carbon; $R-Na_2Fe_2(CN)_6//$sodium metal; $NVP//Na_2Ti_3O_7 \leftrightarrows Na_{3-x}Ti_3O_7$ pathway; $NVP//Na_2Ti_6O_{13}$; $NVP//$graphite; $NVP//$hard carbon; $NVP//$sodium metal; $Na_4Mn_3(PO_4)_2(P_2O_7)//Na_2Ti_3O_7 \leftrightarrows Na_{3-x}Ti_3O_7$ pathway; $Na_4Mn_3(PO_4)_2(P_2O_7)//Na_2Ti_6O_{13}$; $Na_4Mn_3(PO_4)_2(P_2O_7)//$graphite; $Na_4Mn_3(PO_4)_2(P_2O_7)//$hard carbon; and $Na_4Mn_3(PO_4)_2(P_2O_7)//$sodium metal, where: $0\leq a\leq1$; $0\leq b\leq0.3$; $0\leq c\leq0.5$; $0\leq d\leq0.6$; $0\leq e\leq0.3$; $0\leq f\leq0.2$; and $0\leq g\leq0.4$, and M is selected from one or more of the group consisting of Mo, Zn, Mg, Cr, Co, Zr, Al, Ca, K, Sr, Li, H, Sn, Te, Sb, Nb, Sc, Rb, Cs, and Na.

As noted above, when the active material for the cathode is chosen from the materials covered by the formula $Na_a[Cu_bFe_cMn_dNi_eTi_fM_g]O_2$, the material may be used in combination with any of the negative active materials disclosed herein. For example, the cathode and anode active material pair may be selected from $Na_a[Cu_bFe_cMn_dNi_eTi_fM_g]O_2//TiO_2$, $Na_a[Cu_bFe_cMn_dNi_eTi_fM_g]O_2//Na_2Ti_3O_7 \leftrightarrows Na_{3-x}Ti_3O_7$ pathway, $Na_a[Cu_bFe_cMn_dNi_eTi_fM_g]O_2//Na_2Ti_6O_{13}$, $Na_a[Cu_bFe_cMn_dNi_eTi_fM_g]O_2//$graphite, $Na_a[Cu_bFe_cMn_dNi_eTi_fM_g]O_2//$hard carbon, $Na_a[Cu_bFe_cMn_dNi_eTi_fM_g]O_2//$sodium metal, $Na_{0.9}[Cu_{0.12}Ni_{0.10}Fe_{0.30}Mn_{0.43}Ti_{0.05}]O_2//TiO_2$, $Na_{0.9}$ $[Cu_{0.12}Ni_{0.10}Fe_{0.30}Mn_{0.43}Ti_{0.05}]O_2$//$TiO_2 \leftrightarrows N_{3-x}Ti_3O_7$ pathway, $Na_{0.9}[Cu_{0.12}Ni_{0.10}Fe_{0.30}Mn_{0.43}Ti_{0.05}]O_2$//$Na_2Ti_6O_{13}$, $Na_{0.9}[Cu_{0.12}Ni_{0.10}Fe_{0.30}Mn_{0.43}Ti_{0.05}]O_2$//graphite, $Na_{0.9}[Cu_{0.12}Ni_{0.10}Fe_{0.30}Mn_{0.43}Ti_{0.05}]O_2$//hard carbon, and $Na_{0.9}[Cu_{0.12}Ni_{0.10}Fe_{0.30}Mn_{0.43}Ti_{0.05}]O_2$//sodium metal. For example, when the active material for the cathode is chosen from the materials covered by the formula $Na_a[Cu_bFe_cMn_d\-Ni_eTi_fM_g]O_2$, the cathode and anode active material pair may be $Na_{0.9}[Cu_{0.12}Ni_{0.10}Fe_{0.30}Mn_{0.43}Ti_{0.05}]O_2$//hard carbon.

Particular cathode and anode active material pairs may operate within defined average voltage windows. As such, the NIBs disclosed herein may be grouped according to the average voltage produced by these cathode and anode pairs in a battery comprising the electrolytes disclosed herein, which groups may be an average voltage of from 1.5V to less than 2.5V, from 2.5V and up (e.g. to 6.0 V).

Cathode and anode pairs that operate herein at an average voltage of from 1.5V to less than 2.5V include $M-Na_2Fe_2(CN)_6\cdot 2H_2O$//graphite, $M-Na_2Fe_2(CN)_6\cdot 2H_2O$//$Na_2Ti_6O_{13}$, $R-Na_2Fe_2(CN)_6$//graphite, $R-Na_2Fe_2(CN)_6$//$Na_2Ti_6O_{13}$, NVP//graphite, NVP//$Na_2Ti_6O_{13}$, $M-Na_2Fe_2(CN)_6\cdot 2H_2O$//$TiO_2$, $R-Na_2Fe_2(CN)_6$//$TiO_2$, NVP//$TiO_2$, $Na_a[Cu_bFe_cMn_dNi_eTi_fM_g]O_2$//graphite, $Na_a[Cu_bFe_cMn_dNi_eTi_fM_g]O_2$//$Na_2Ti_6O_{13}$, and $Na_a[Cu_bFe_cMn_dNi_eTi_fM_g]O_2$//$TiO_2$. Particular pairs that may be mentioned in relation to this voltage range include $M-Na_2Fe_2(CN)_6\cdot 2H_2O$//graphite, $M-Na_2Fe_2(CN)_6\cdot 2H_2O$//$Na_2Ti_6O_{13}$, $R-Na_2Fe_2(CN)_6$//graphite, $R-Na_2Fe_2(CN)_6$//$Na_2Ti_6O_{13}$, NVP//graphite, and NVP//$Na_2Ti_6O_{13}$.

Cathode and anode pairs that operate herein at an average voltage of from 2.5V and up include $M-Na_2Fe_2(CN)_6\cdot 2H_2O$//$Na_2Ti_3O_7 \leftrightarrows Na_{3-x}Ti_3O_7$ pathway, $M-Na_2Fe_2(CN)_6\cdot 2H_2O$//hard carbon, $M-Na_2Fe_2(CN)_6\cdot 2H_2O$//sodium metal, $R-Na_2Fe_2(CN)_6$//$Na_2Ti_3O_7 \leftrightarrows Na_{3-x}Ti_3O_7$ pathway, $R-Na_2Fe_2(CN)_6$//hard carbon, $R-Na_2Fe_2(CN)_6$//sodium metal, NVP//$Na_2Ti_3O_7 \leftrightarrows Na_{3-x}Ti_3O_7$ pathway, NVP//hard carbon, NVP//sodium metal, $Na_4Mn_3(PO_4)_2(P_2O_7)$//$Na_2Ti_3O_7 \leftrightarrows Na_{3-x}Ti_3O_7$ pathway, $Na_4Mn_3(PO_4)_2(P_2O_7)$//$Na_2Ti_6O_{13}$ $Na_4Mn_3(PO_4)_2(P_2O_7)$//graphite, $Na_4Mn_3(PO_4)_2(P_2O_7)$//hard carbon, $Na_4Mn_3(PO_4)_2(P_2O_7)$//sodium metal, $Na_4Mn_3(PO_4)_2(P_2O_7)$//$TiO_2$, $Na_a[Cu_bFe_cMn_dNi_eTi_fM_g]O_2$//$Na_2Ti_3O_7 \leftrightarrows Na_{3-x}Ti_3O_7$ pathway, $Na_a[CU_bFe_cMn_dNi_eTi_fM_g]O_2$//hard carbon, and $Na_a[Cu_bFe_cMn_dNi_eTi_fM_g]O_2$//sodium metal. Particular pairs that may be mentioned in relation to this voltage range include $M-Na_2Fe_2(CN)_6\cdot 2H_2O$//$Na_2Ti_3O_7 \leftrightarrows Na_{3-x}Ti_3O_7$ pathway, $M-Na_2Fe_2(CN)_6\cdot 2H_2O$//hard carbon, $M-Na_2Fe_2(CN)_6\cdot 2H_2O$//sodium metal, $R-Na_2Fe_2(CN)_6$//$Na_2Ti_3O_7 \leftrightarrows Na3-xTi_3O_7$ pathway, $R-Na_2Fe_2(CN)_6$//hard carbon, $R-Na_2Fe_2(CN)_6$//sodium metal, NVP//$Na_2Ti_3O_7 \leftrightarrows Na_{3-x}Ti_3O_7$ pathway, NVP//hard carbon, NVP//sodium metal, $Na_4Mn_3(PO_4)_2(P_2O_7)$//$Na_2Ti_3O_7 \leftrightarrows Na_{3-x}Ti_3O_7$ pathway, $Na_4Mn_3(PO_4)_2(P_2O_7)$//$Na_2Ti_6O_{13}$ $Na_4Mn_3(PO_4)_2(P_2O_7)$//graphite, $Na_4Mn_3(PO_4)_2(P_2O_7)$//hard carbon, and $Na_4Mn_3(PO_4)_2(P_2O_7)$//sodium metal.

The sodium-ion battery also includes a separator. The separator is not particularly limited, and may be any suitable separator utilized for a sodium-ion battery. For example, a porous layer or a nonwoven fabric showing excellent high rate discharge performance and/or the like may be utilized alone or as a mixture (e.g., in a laminated structure).

A substrate of the separator may include, for example, a polyolefin-based resin, a polyester-based resin, polyvinylidene difluoride (PVDF), a vinylidene difluoride-hexafluoropropylene copolymer, a vinylidene difluoride-perfluorovinylether copolymer, a vinylidene difluoride-tetrafluoroethylene copolymer, a vinylidene difluoride-trifluoroethylene copolymer, a vinylidene difluoride-fluoroethylene copolymer, a vinylidene difluoride-hexafluoroacetone copolymer, a vinylidene difluoride-ethylene copolymer, a vinylidene difluoride-propylene copolymer, a vinylidene difluoride-trifluoropropylene copolymer, a vinylidene difluoride-tetrafluoroethylene-hexafluoropropylene copolymer, a vinylidene difluoride-ethylene-tetrafluoroethylene copolymer, and/or the like. The polyolefin-based resin may be polyethylene, polypropylene, and/or the like; and the polyester-based resin may be polyethylene terephthalate, polybutylene terephthalate, and/or the like.

The porosity of the separator is not particularly limited, and may be any suitable porosity that a separator of a sodium-ion battery may have.

The separator may include a coating layer including an inorganic filler may be formed on at least one side of the substrate. The inorganic filler may include $Al_2O_3$, $Mg(OH)_2$, $SiO_2$, and/or the like. The coating layer including the inorganic filler may inhibit direct contact between the positive electrode and the separator, inhibit oxidation and decomposition of an electrolyte on the surface of the positive electrode during storage at a high temperature, and suppress the generation of gas which is a decomposed product of the electrolyte. A suitable separator that may be mentioned herein is a glass fibre separator.

It will be appreciated that any of the above separators may be used in the aspects and embodiments of the current invention, provided that they are a technically sensible choice.

As noted above, the electrolyte comprises at a salt and a glyme solvent, where the salt includes $NaBF_4$. The $NaBF_4$ may be present in any suitable concentration, such as from greater than 0 to less than or equal to 2.5 M in the glyme solvent. Suitable concentrations of $NaBF_4$ include, but are not limited to from 0.5 to less than or equal to 2.5 M, from 0.75 to 2.5 M, from 1.0 to 2.5 M, from 1.5 to 2.5 M, from 2.0 to 2.5 M, from 0.5 to 2.0 M, from 0.5 to 1.5 M, from 0.5 to 1.0 M, and from 0.5 to 0.75 M in the glyme solvent. For example, the $NaBF_4$ may be present in a concentration of 1 M in the glyme solvent. For the avoidance of doubt, "M" when used herein in relation to concentration refers to Molarity (i.e. moles per litre of solvent).

The salt may further comprise one or more salts selected from the group consisting of NaCN, $NaClO_4$, $NaAsF_6$, $NaPF_6$, $NaPF_{6-x}(C_nF_{2n+1})_x$ (1<x<6, n=1 or 2), NaSCN, NaBr, NaI, $Na_2SO_4$, $Na_2B_{10}Cl_{10}$, NaCl, NaF, $NaPF_4$, NaOCN, $Na(CF_3SO_3)$, $NaN(CF_3SO_2)_2$, $NaN(FSO_2)$, $NaN(C_2F_5SO_2)_2$, $NaN(CF_3SO_2)(C_4F_9SO_2)$, $NaC(CF_3SO_2)_3$, $NaC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, sodium stearyl sulfonate, sodium octyl sulfonate, and sodium dodecylbenzene sulfonate. In certain embodiments that may be mentioned herein, the salt may further comprise one or more salts selected from the group consisting of $NaClO_4$, $NaPF_6$, NaSCN, NaBr, NaI, NaCl, NaOCN, $Na(CF_3SO_3)$, $NaN(CF_3SO_2)_2$, and NaCN. When any of these additional salts are included in the electrolyte composition, each salt may be provided in a suitable concentration. Suitable concentrations for each of these additional salts include, but are not limited to from 0.5 to less than or equal to 2.5 M, from 0.75 to 2.5 M, from 1.0 to 2.5 M, from 1.5 to 2.5 M, from 2.0 to 2.5 M, from 0.5 to 2.0 M, from 0.5 to 1.5 M, from 0.5 to 1.0 M, and from 0.5 to 0.75 M in the glyme solvent. For example, each additional salt (when present) may be present in a concentration of 1 M in the glyme solvent. The above salts may be present in any suitable ratio with respect to $NaBF_4$.

The glyme solvent may be selected from one or more of the group consisting of ethylene glycol dimetheyl ether (monoglyme), diglyme, triglyme, tetraglyme, methyl nonafluorobutyl ether (MFE) and analogues thereof. Analogues of tetraglyme ($CH_3(O(CH_2)_2)_4OCH_3$) that may be mentioned include, but are not limited to, compounds where one or both of its $CH_3$ end members may be modified to either —$C_2H_5$ or to —$CH_2CH_2Cl$, or other similar substitutions. In certain embodiments of the invention that may be mentioned herein, the glyme solvent is tetraglyme.

While the glyme solvent may only contain a glyme-based solvent, it may in certain embodiments also contain an additional suitable solvent, that is a solvent compatible for use in a sodium-ion battery. Suitable solvents that may be mentioned herein include, but are not limited to one or more of a cyclic carbonate(such as propylene carbonate, ethylene carbonate, diethyl carbonate butylene carbonate, fluoroethylene carbonate, chloroethylene carbonate, vinylene carbonate, and/or the like), a linear carbonate (such as dimethyl carbonate, diethyl carbonate, ethylmethyl carbonate, and the like), a cyclic ester (such as γ-butyrolactone, γ-valerolactone, and the like), a linear ester (such as methyl formate, methyl acetate, methyl butyrate, and the like), a cyclic or linear ether other than a glyme (such as tetrahydrofuran (and derivatives thereof), 1,3-dioxane, 1,4-dioxane, 1,2-dimethoxy ethane, 1,4-dibutoxyethane, and the like), a nitrile (such as acetonitrile, benzonitrile, and/or the like), dioxolane or a derivative thereof, ethylene sulfide, sulfolane, and sultone or a derivative thereof. These solvents may be used in any suitable weight ratio with respect to the glyme solvent (e.g. tetraglyme). For example, the additional solvents may be selected from one or more of the group selected from propylene carbonate, ethylene carbonate, diethyl carbonate, dimethyl carbonate, ethyl methyl carbonate, tetrahydrofuran, sulfolane, and acetonitrile.

The electrolyte may further include various suitable additives such as a negative electrode SEI (Solid Electrolyte Interface) forming agent, a surfactant, and/or the like. Such additives may be, for example, succinic anhydride, lithium bis(oxalato)borate, sodium bis(oxalato)borate, lithium tetrafluoroborate, a dinitrile compound, propane sultone, butane sultone, propene sultone, 3-sulfolene, a fluorinated allylether, a fluorinated acrylate, carbonates such as vinylene carbonate, vinyl ethylene carbonate and fluoroethylene carbonate and/or the like. The concentration of the additives may be any suitable one that is utilized in a general NIB. Particular additives that may be included in the electrolyte are those selected from one or more of the group consisting of fluoroethylene carbonate (FEC), vinylene carbonate (VC), vinyl ethylene carbonate (VEC), and adiponitrile. The above additives may be present in any suitable weight ratio.

In a NIB, the separator may be disposed between the positive electrode and the negative electrode to manufacture an electrode structure, and the electrode structure is processed to have a desired shape, for example, a cylinder, a prism, a laminate shape, a button shape, and/or the like, and inserted into a container having the same shape. Then, the non-aqueous electrolyte is injected into the container, and the electrolyte is impregnated in the pores in the separator, thereby manufacturing a rechargeable sodium or sodium-ion battery.

Hereinafter, embodiments of the invention are illustrated in more detail with reference to the following examples. However, the present disclosure is not limited thereto.

Furthermore, what is not described in this disclosure may be sufficiently understood by those who have knowledge in this field and will not be illustrated herein.

EXAMPLES

Synthesis of Sodium Titanate ($Na_2Ti_3O_7$)

$Na_2Ti_3O_7$ was synthesized by stirring appropriate quantities of sodium hydroxide and titanium isopropoxide in Milli-Q water, to which a certain quantity of ascorbic acid was added. After stirring for a few hours, the solution was dried on a hot plate or in an oven to remove the water. The as-obtained dry powder was ground and then fired at 850° C. for 6 h in flowing Ar gas in a tube furnace. The as-obtained black powder was the desired $Na_2Ti_3O_7$ material embedded in a carbon matrix (referred as $Na_2Ti_3O_7$/C), with similar morphology to that described in A. Rudola, N. Sharma, and P. Balaya, *Electrochem. Commun.*, 2015, 61, 10-13.

Synthesis of M—$Na_2Fe_2(CN)_6.2H_2O$

In a typical synthesis, 5 mmoles of $Na_4Fe(CN)_6$ and 22.5 mmoles of ascorbic acid were added to 100 mL of Milli-Q water in a round bottom flask. The flask was immersed in a silicone oil bath which was kept at 140° C. The solution was stirred for 4 hours while being refluxed such that the reflux temperature of the solution, measured by a thermometer dipped into the solution, was around 107° C. (solution displayed vigorous bubbling throughout). The flask was then taken out of the oil bath and allowed to cool to room temperature, whereupon a white precipitate was obtained below a yellow coloured solution. The precipitate could be recovered by either centrifugation or filtration (the precipitate retrieval method did not alter phase purity). During this process, the white precipitate acquired a faint cyan tinge. The precipitate was then dried at 70° C. in air for 3 h resulting in the final compound.

Synthesis of R—$Na_2Fe_2(CN)_6$

R—$Na_2Fe_2(CN)_6$ was synthesised based on the conversion of M—$Na_2Fe_2(CN)_6.2H_2O$ into R—$Na_2Fe_2(CN)_6$ by heating M—$Na_2Fe_2(CN)_6.2H_2O$ (in electrode form or otherwise) as described in PCT application No. PCT/SG2017/050203 and *J. Electochem. Soc.* 2017, 164, A1098-A1109.

Electrode Preparation, Cell Assembly and Electrochemical Evaluation

Composite electrodes were made with the as synthesised material as the active material, Ketjen Black (KB) (Lion Corporation) as the conductive additive and sodium salt of carboxymethyl cellulose, CMC (Alfa Aesar), as the binder in the weight ratio 85:10:5. In order to make the slurry, CMC was first dissolved in Milli-Q water to which a hand ground mixture of M—$Na_2Fe_2(CN)_6.2H_2O$ and KB were added. After stirring at 1200 rpm for 2 h, the slurry was coated on Al foil with the doctor blade technique and then dried overnight at 120° C. under 1 mbar vacuum. Upon drying, the coated electrode was pressed by a twin roller at a pressure of 37 psi. Electrodes were hence punched with an active material loading between 3-4 mg $cm^{-2}$. Coin cells of 2016 type (MTI Corporation) were fabricated with such electrodes as the working electrode and Na metal (Merck) as the counter and reference electrodes with a glass fiber (Whatman, grade GF/A) as a separator layer. Prior to cell assembly, the electrodes were dried at 120° C. in 1 mbar vacuum and brought inside an Ar filled glove box (MBraun, Germany) with $H_2O$ and $O_2$<5 ppm.

The coin cells were cycled in a computer controlled Arbin battery tester (model BT2000, USA) at room temperature.

Full Cell Evaluation

Graphite (MCMB graphite, model TB-17, from MTI) was used to make the graphite slurry with CMC as the binder in the weight ratio 95:5 (no external conductive additive was used). As described above, $Na_2Ti_3O_7/C$ was synthesised by a scaled-up modified version of the synthesis reported in our previous report with water as the solution medium with an in-situ C content of about 14 weight % (A. Rudola, N. Sharma, and P. Balaya, *Electrochem. Commun.*, 2015, 61, 10-13). The $Na_2Ti_3O_7/C$ slurry was prepared with Super P carbon black (as conductive additive) and CMC as binder in the weight ratio 90:5:5 such that the final weights in the slurry were as follows—$Na_2Ti_3O_7$: in-situ and ex-situ carbon: CMC=76:19:5.

For the $M-Na_2Fe_2(CN)_6 \cdot 2H_2O$//graphite full cell, the weight ratio of active material in the anode to cathode was 0.68:1 (excess cathode was used to compensate for initial coulombic inefficiencies). For the R—$Na_2Fe_2(CN)_6$//graphite full cell, the anode to cathode (active material) weight ratio was 1.05:1 (excess cathode was used due to reasons mentioned below) while for the R—$Na_2Fe_2(CN)_6$//$Na_2Ti_3O_7 \leftrightarrows Na_{3-x}Ti_3O_7$ full cell, the anode to cathode (active material) weight ratio was 0.95:1. All full cells were straightaway assembled without any pre-cycling of cathodes or anodes. For the R—$Na_2Fe_2(CN)_6$//graphite full cell, the discharge was controlled by time rather than voltage while the charge cut-off voltage was 3.3 V. For the R—$Na_2Fe_2(CN)_6$//$Na_2Ti_3O_7 \leftrightarrows Na_{3-x}Ti_3O_7$ full cell, owing to the flat $Na^+$ ion insertion plateau of the $Na_2Ti_3O_7 \leftrightarrows Na_{3-x}Ti_3O_7$ pathway, the upper cut-off voltage was dynamically increased by small increments in the initial cycles to compensate for the slight increase of the cathode potential per cycle due to the lower coulombic efficiencies in the initial cycles.

By utilising such modified cycling protocols for both the full cells that used R—$Na_2Fe_2(CN)_6$ as the cathode, the slightly lower coulombic efficiencies in the initial cycles inherently led to voltage slippage to higher potentials for the cathode such that it eventually cycled within its upper charge-discharge plateaus.

The average voltage of the full cell was computed by calculating the area under the voltage vs specific capacity curve of a discharge cycle (the calculated area was the specific energy density delivered by the full cell) and then this value was divided by the specific capacity (specific energy density=specific capacity*average voltage). The coulombic efficiency of a full cell was calculated by taking the ratio of the discharge capacity to the charge capacity.

Preparation of Electrolytes

The solvents, ethylene carbonate (EC, Alfa Aesar), propylene carbonate (PC, Sigma Aldrich), dimethyl carbonate, (DMC, Kishida chemicals), diethylene glycol dimethyl ether (diglyme, anhydrous, 99.5%, Sigma Aldrich) and tetraethylene glycol dimethyl ether (tetraglyme, ≥99%, Sigma Aldrich) were obtained from commercial sources and used without further purification. EC-PC (1:1, v/v) and EC-DMC (1:1, v/v) mixtures were prepared in-house accordingly.

Similarly, the Na salts, $NaClO_4$ (98+%, anhydrous, Alfa Aesar), $NaPF_6$ (99+%, Alfa Aesar), $NaBF_4$ (98%, Sigma Aldrich) were obtained from commercial sources and used without further purification. In an alternative to making 1 M $NaPF_6$ in EC:DMC (1:1, v/v) electrolyte, it was purchased from Kishida chemicals.

The 1 M $NaBF_4$ in tetraglyme electrolyte was prepared by dissolving $NaBF_4$ in a required quantity of tetraglyme. The mixture was then stirred to fully dissolve the salt. Typically, the salt dissolves within 10 to 15 min. Once prepared, the electrolyte can be added directly into NIBs with different combinations of cathodes and anodes (as detailed later) in any configuration (cylindrical cells, prismatic cells, button/coin cells, pouch cells or in any other configuration).

Flammability Tests and DSC Measurements on the Electrolytes

A standard protocol was used to assess the flammability of all reported electrolytes. A precise 400 μL of each electrolyte was taken in sealed Ar-filled vials from the glove box. They were then transferred to a fume hood in ambient air. Each electrolyte was poured onto a coin cell casing such that it completely filled the case. Then, an open flame was made to touch the surface of the electrolyte with t=0 s as the moment the flame touched the electrolyte. The open flame was made to continuously touch the electrolyte until it caught fire. The 1 M $NaBF_4$ in tetraglyme electrolyte did not catch fire for 1 complete minute of continuous open flame exposure.

For differential scanning calorimetry (DSC) measurements, the electrolytes were sealed in aluminium capsules inside an Ar-filled glove box, followed by measurements performed using a TA Instrument 2920 at 10° C./min ramp rate. No air exposure occurred during the DSC measurements.

The results detailed in the following examples and FIGS. 1-12 show that the 1 M $NaBF_4$ in tetraglyme electrolyte can function very well with different types of high voltage cathodes, low voltage anodes and in combination of these electrodes.

Example 1

Electrochemical Stability of Electrolytes

To examine the anodic stability of the electrolyte, a cyclic voltammetry (CV) experiment was carried out using a bare aluminum (Al) foil as the working electrode (WE), sodium (Na) metal served as the counter electrode (CE) and reference electrode (RE) and the 1 M $NaBF_4$ in tetraglyme as the electrolyte. CV was conducted between 0.0-5.0 V vs $Na/Na^+$ to determine the voltage window of this electrolyte and the results are as shown in FIG. 1. For comparison, the CV curve of one of the most widely used and stable NIB electrolytes, 1 M $NaClO_4$ in EC (ethylene carbonate)-PC (propylene carbonate) in 1:1 volume ratio, has also been included.

During oxidation at high potentials, 1 M $NaBF_4$ in tetraglyme showed significantly reduced oxidation currents with respect to that of 1 M $NaClO_4$ in EC-PC. In fact, the latter showed a significant current spike after 4.8 V vs $Na/Na^+$ whereas the former showed a much reduced current spike after 4.8 V, suggesting that 1 M $NaBF_4$ in tetraglyme may be more resistant to oxidation as compared to 1 M $NaClO_4$ in EC-PC. Both electrolytes were reduced at below 1 V vs $Na/Na^+$, which is expected as this led to the formation of a stable solid-electrolyte interface (SEI) which prevents further reduction of the electrolyte in subsequent cycles.

The CV results reported herein do not relate to any specific cathodes and the results imply that this electrolyte should lead to good sodium storage performance in high voltage cathodes (>3 V vs $Na/Na^+$ and certainly up to 4-4.2 V).

Example 2

Performance of Low Voltage $Na_2Ti_3O_7$ Anode in Different Electrolytes, Using the $Na_2Ti_3O_7 \leftrightarrows Na_4Ti_3O_7$ Pathway To determine the extent of the first cycle reduction of the electrolyte and how it may negatively affect the first cycle coulombic efficiency of a low voltage anode, the low voltage sodium titanate ($Na_2Ti_3O_7$) anode in the form of the $Na_2Ti_3O_7 \leftrightarrows Na_4Ti_3O_7$ deep discharged pathway, was chosen. The use of $Na_2Ti_3O_7$ as a NIB anode is well-studied, owing to its high capacity (177.8 mAh/g) and low average voltage (about 0.3 V vs $Na/Na^+$) (A. Rudola, et al., *J. Mater. Chem. A*, 2013, 1, 2653-2662).

Figure 2:
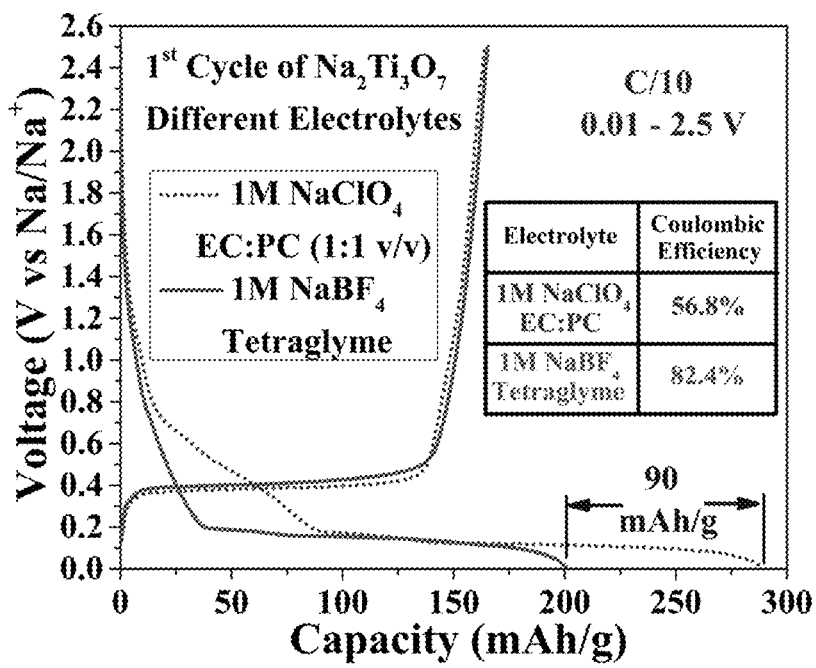
FIG. 2 depicts first cycle coulombic efficiency curves of a Na$_2$Ti$_3$O$_7$ anode (for the Na$_2$Ti$_3$O$_7\leftrightarrows$Na$_4$Ti$_3$O$_7$ deep discharged pathway) in 1 M NaBF$_4$ in tetraglyme and in 1 M NaClO$_4$ in EC-PC.

The first cycle of this anode at a C/10 rate between 2.5-0.01 V vs $Na/Na^+$ is shown in FIG. 2 with the above two electrolytes and with all other conditions being the same. In both electrolytes, the same charge (sodium extraction) capacity of 165 mAh/g was obtained. However, the first discharge (sodium insertion) capacity for 1 M $NaClO_4$ in EC-PC was 289 mAh/g while that for 1 M $NaBF_4$ in tetraglyme was just 200 mAh/g. As stated previously, this long first cycle discharge capacity is due to electrolyte reduction at reducing voltages close to 0.0 V vs $Na/Na^+$. This electrolyte reduction is extremely undesirable as it leads to low first cycle coulombic efficiency (ratio of charge to discharge capacity for an anode in a half cell configuration) which would adversely affect the energy density of a NIB utilising this anode against an appropriate cathode. For the 1 M $NaClO_4$ in EC-PC electrolyte, the first cycle coulombic efficiency was quite low at 56.8%, whereas for the 1 M $NaBF_4$ in tetraglyme electrolyte, it was fairly high at 82.4%.

As such, the use of a low voltage insertion anode such as $Na_2Ti_3O_7$ with 1 M $NaBF_4$ in tetraglyme as the electrolyte can save as much as 90 mAh/g in irreversible capacity. This is a significant margin and would lead to the use of a lighter corresponding cathode (i.e. lighter in weight) as this irreversible capacity would need to be supplied by the cathode in a full cell. In this way, this electrolyte can lead to a significant energy density gain for the same anode and cathode combination in an NIB. This is an extremely important advantage of this electrolyte over existing electrolytes in this field.

Example 3

Performance of $Na_2Ti_3O_7$ Anode in 1 M $NaBF_4$ in Tetraglyme Electrolyte Using $Na_2Ti_3O_7 \leftrightarrows Na_{3-x}Ti_3O_7$ Pathway The conventional $Na_2Ti_3O_7 \leftrightarrows Na_4Ti_3O_7$ deep discharged pathway (in example 2) suffers from a poor cycle life and is normally limited to about 100 cycles. As such, it would not be desirable to use such an anode for large-scale grid storage batteries where the cycle life is expected to be a few thousand cycles. Therefore, in order to test the sodium storage performance of $Na_2Ti_3O_7$ with this new electrolyte, the recently discovered $Na_2Ti_3O_7 \leftrightarrows Na_{3-x}Ti_3O_7$ sodium storage pathway for $Na_2Ti_3O_7$ was chosen, as this pathway possesses a moderate-high capacity of 88.9 mAh/g along with a very low charge plateau at 0.2 V vs $Na/Na^+$ and a long cycle life in excess of 1,500 cycles (A. Rudola, et al., *Electrochem. Commun.*, 2015, 61, 10-13 and PCT application No. PCT/SG2016/050094).

Figure 3A:
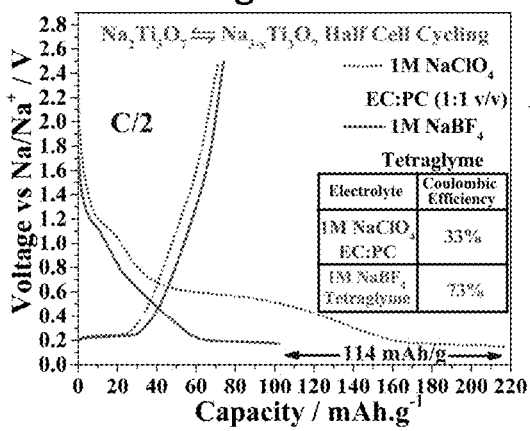
FIGS. 3A-3D depict sodium storage performance of the Na$_2$Ti$_3$O$_7\leftrightarrows$Na$_{3-x}$Ti$_3$O$_7$ sodium storage pathway anode in a Na half-cell.

The first galvanostatic cycle of the $Na_2Ti_3O_7 \leftrightarrows Na_{3-x}Ti_3O_7$ pathway with the two electrolytes is shown in FIG. 3A. While the same flat charge plateau at 0.2 V is obtained with both electrolytes, a high coulombic efficiency of 73% is obtained when 1 M $NaBF_4$ in tetraglyme was used as the electrolyte as opposed to 33% when 1 M $NaClO_4$ in EC-PC was used as the electrolyte. Similar to the case for the deep discharged pathway with these two electrolyte solutions, switching the electrolyte to the 1 M $NaBF_4$ in tetraglyme electrolyte from conventional carbonate-based state-of-the-art electrolytes can potentially save as much as 114 mAh/g in irreversible capacity for the $Na_2Ti_3O_7 \leftrightarrows Na_{3-x}Ti_3O_7$ pathway, if all other experimental conditions remain the same, which is a significant advantage.

Figure 3B:
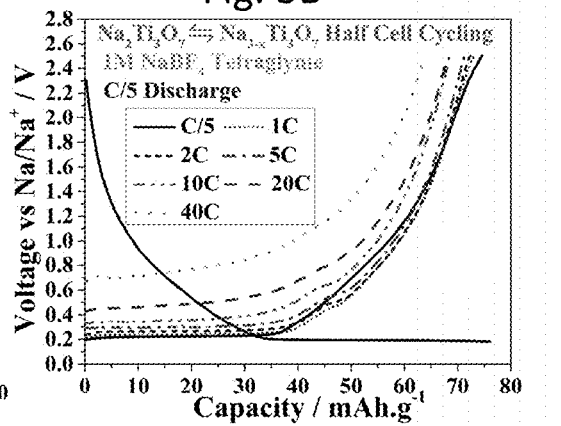
Figure 3C:
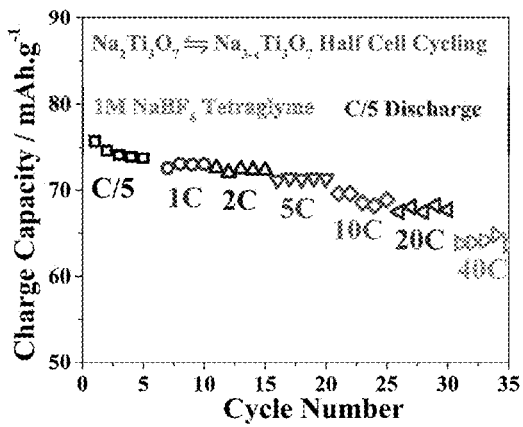
Figure 3D:
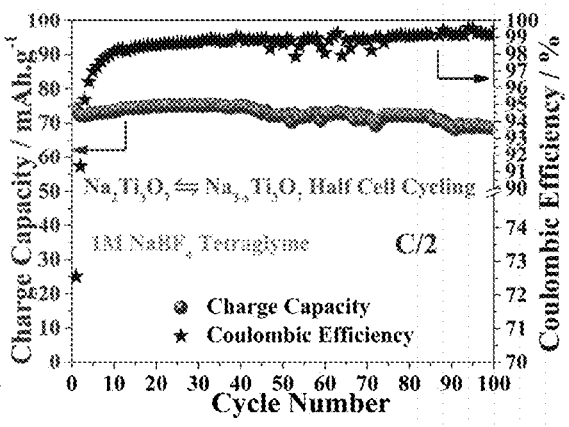

From a cycling performance point of view, as seen from FIG. 3B and FIG. 3C, this pathway was capable of responding even at an ultra-fast 40 C rate (90 s), similar to the previous report on this pathway using the conventional 1 M $NaClO_4$ in EC-PC electrolyte (A. Rudola, et al., *Electrochem. Commun.*, 2015, 61, 10-13). More importantly, as seen from FIG. 3D, the pathway demonstrated negligible capacity loss over 100 cycles, with a stable coulombic efficiency above 99%. These results prove the efficacy of this electrolyte with a low voltage transition metal based anode such as the $Na_2Ti_3O_7 \leftrightarrows Na_{3-x}Ti_3O_7$ sodium storage pathway.

Example 4

Performance of Graphite Anode in 1 M $NaBF_4$ in Tetraglyme

An important advantage of $NaBF_4$ in tetraglyme is that, being glyme based, it can allow sodium storage in graphite in the form of co-intercalation of sodium and solvent molecules, which cannot be achieved using conventional NIB electrolytes based on alkyl carbonates (B. Jache, et al., *Angew. Chem. Int. Ed.*, 2014, 53, 10169-10173). Graphite, being extremely inexpensive, shows a moderate-high sodium storage capacity approaching 100 mAh/g, with all the capacity contributions essentially within a safe voltage range of 0.4 V vs $Na/Na^+$ to 1.3 V vs $Na/Na^+$ (B. Jache, et al., *Angew. Chem. Int. Ed.*, 2014, 53, 10169-10173). Due to its favourably low but not too low voltage activity (between 1.3 -0.4 V vs $Na/Na^+$), the usage of graphite in a NIB may be safe at low voltages as it appears that this would avoid sodium plating on the graphite anode (which typically may occur around 0.0 V vs $Na/Na^+$). It should be noted that graphite cannot be used as an NIB anode with the traditional carbonate-based state-of-the-art NIB electrolytes, as graphite cannot store Na (it can only store sodium by the co-intercalation mechanism in glyme-based electrolytes which entails simultaneous storing of Na as well as the solvent of the electrolyte).

Figure 4A:
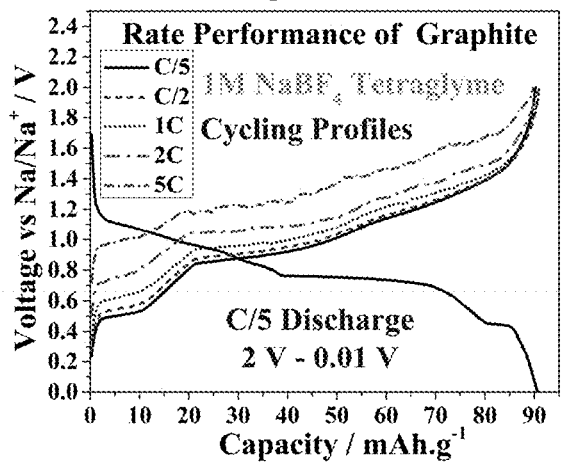

FIG. 4 shows the sodium storage performance of a graphite electrode in 1 M $NaBF_4$ in tetraglyme electrolyte. From FIG. 4A, which shows the cycling curves of graphite in 1 M $NaBF_4$ in tetraglyme electrolyte vs sodium metal, it can be seen that the cycling curves of graphite are identical to what has been reported in the literature with other glyme-based electrolytes and that there is very little capacity contribution below 0.4 V vs $Na/Na^+$. The graphite electrode exhibits impressive rate performance characteristics, with essentially no drop in charge capacity. The charge capacity was about 91 mAh/g at C/5 rate and was at 89 mAh/g at 5 C rate, suggesting that the material can retain almost 100% of its capacity when the operating conditions switch from that requiring a 5 h response of a battery to that requiring a fast 12 min response.

Figure 4B:
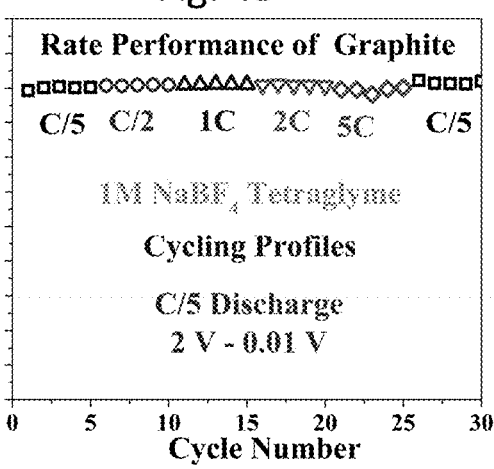
Figure 4C:
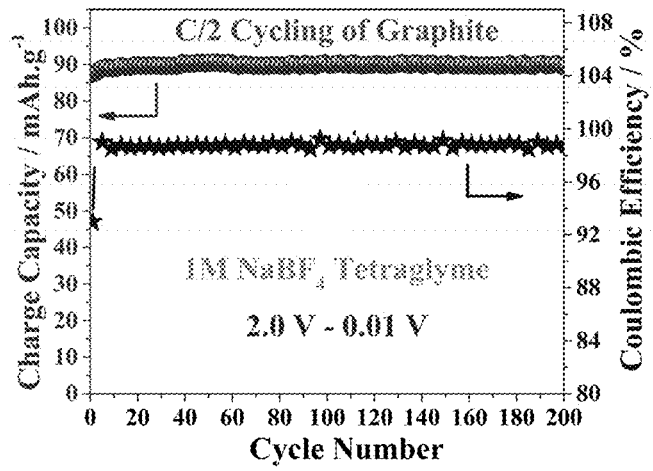

From FIG. 4B, it can be seen that the graphite electrode is stable at these various rates as well. More importantly, the graphite electrode showed no observable capacity loss in 200 cycles at C/2 rate with a high coulombic efficiency around 99% throughout cycling (FIG. 4C). Hence, graphite, similar to the $Na_2Ti_3O_7 \leftrightarrows Na_{3-x}Ti_3O_7$ sodium storage pathway in example 3, is also very compatible and stable with 1 M $NaBF_4$ in tetraglyme electrolyte.

Example 5

Figure 5A:
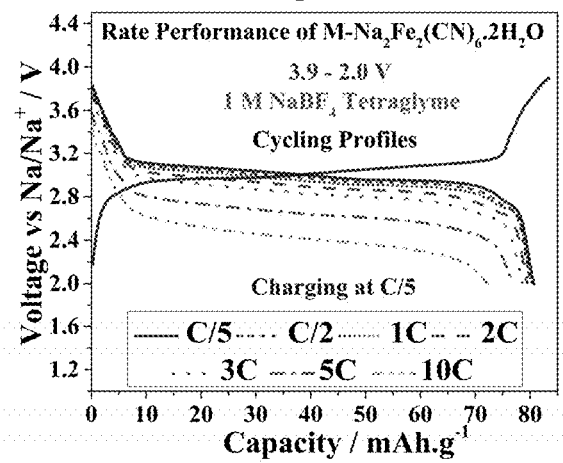
Figure 5B:
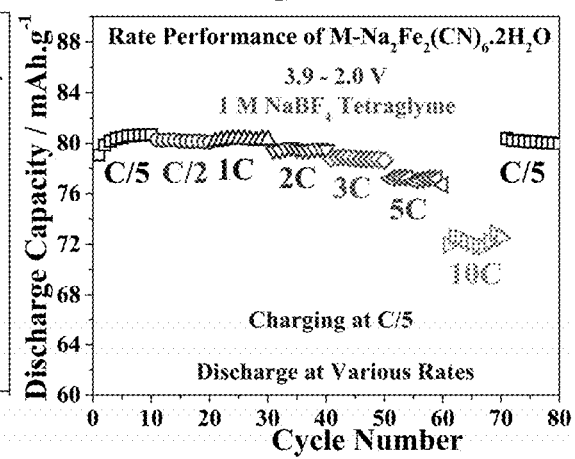
Figure 5C:
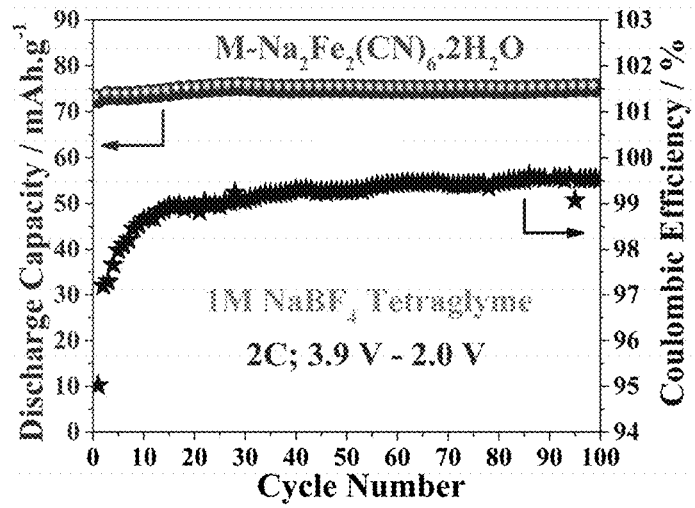

Performance of M-$Na_2Fe_2(CN)_6 \cdot 2H_2O$ Cathode in 1 M $NaBF_4$ in Tetraglyme The 1 M $NaBF_4$ in tetraglyme electrolyte also showed similar excellent performance for the cathode. The M-$Na_2Fe_2(CN)_6 \cdot 2H_2O$ cathode (monoclinic phase of $Na_2Fe_2(CN)_6$), is used in this study as it can operate up to a fairly high voltage of 3.9 V vs Na/Na$^+$ (see International Patent Application No. PCT/SG2017/050203 and *J. Electochem. Soc.* 2017, 164, A1098-A1109). FIG. 5 shows the cycling performance of the M-$Na_2Fe_2(CN)_6 \cdot 2H_2O$ cathode at various rates from C/5 to 10 C. From FIG. 5A, it can be seen that there is little increase in polarisation of this cathode until a fast 10 C rate was used. From FIG. 5B, it is clear that this cathode material is very stable at all rates even with the 1 M $NaBF_4$ in tetraglyme electrolyte. Given the similarity in the rate performance of this new electrolyte with the conventional carbonate based electrolytes, this suggests that adopting this electrolyte would not compromise on the performance of the batteries, and can also improve the safety. The long term cycling performance of the M-$Na_2Fe_2(CN)_6 \cdot 2H_2O$ cathode in this new electrolyte also revealed essentially no capacity loss with a high stable coulombic efficiency above 99.5% (FIG. 5C). This high coloumbic efficiency for the cathode agrees very well with the high anodic stability indications of this electrolyte as had been already revealed by CV experiments (refer to example 1 and FIG. 1).

Example 6

Performance of R—$Na_2Fe_2(CN)_6$ Cathode in 1 M $NaBF_4$ in Tetraglyme

To illustrate the stability of another high voltage cathode with the 1 M $NaBF_4$ in tetraglyme electrolyte, the rhombohedral R$\bar{3}$ phase of $Na_2Fe_2(CN)_6$ (abbreviated as R—$Na_2Fe_2(CN)_6$ henceforth) cathode was chosen as it delivers a high capacity (theoretical capacity of 170.85 mAh/g) with two charge-discharge plateaus centered at 3.1 and 3.3 V vs Na/Na$^+$ (see International Patent Application No. PCT/SG2017/050203 and *J. Electochem. Soc.* 2017, 164, A1098-A1109).

Figure 6A:
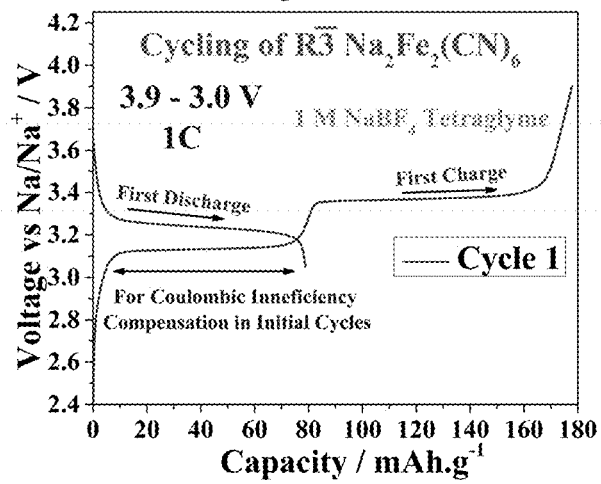

FIG. 6a shows the first galavanostatic cycle of R—$Na_2Fe_2(CN)_6$ between 3.9-3.0 V. In the first charge cycle, two charge plateaus were obtained with the lower charge plateau at 3.1 V and the upper charge plateau at 3.35 V, yielding a capacity just over the theoretical capacity of 170.85 mAh/g. Upon discharge, the R—$Na_2Fe_2(CN)_6$ cathode was purposely cycled till 3.0 V such that the cycling was cut-off just before the onset of the lower discharge plateau, yielding a capacity of 79 mAh/g with the discharge plateau at 3.25 V. This was done because the theoretical capacity of R—$Na_2Fe_2(CN)_6$ cathode, being 170.85 mAh/g, is much higher than the theoretical capacities of graphite (100 mAh/g) and the $Na_2Ti_3O_7 \leftrightarrows Na_{3-x}Ti_3O_7$ sodium storage pathway (88.9 mAh/g). If a full cell is fabricated with R—$Na_2Fe_2(CN)_6$ as the cathode against either of these two anodes, then there would be a big capacity mismatch. Hence, to circumvent this and also to absorb the coulombic inefficiencies of the anode(s) and the cathode in the initial cycles in a full cell, the lower charge plateau of R—$Na_2Fe_2(CN)_6$ could be used to compensate for these inefficiencies (as indicated in FIG. 6A) and the R—$Na_2Fe_2(CN)_6$ cathode can then be actually cycled only within its upper charge-discharge plateaus in the full cell (between 3.9-3.0 V vs Na/Na$^+$).

Figure 6B:
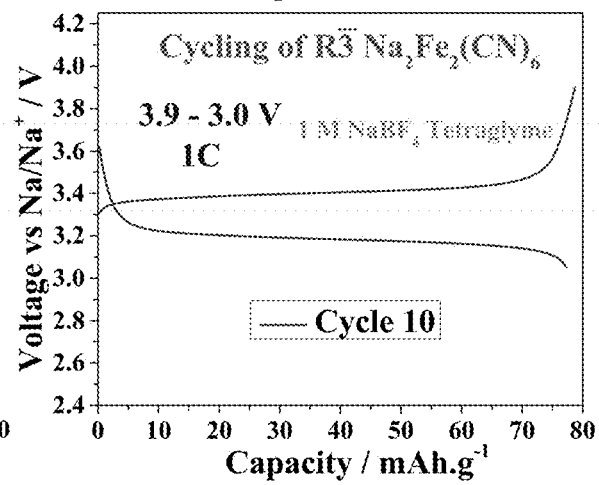
Figure 6C:
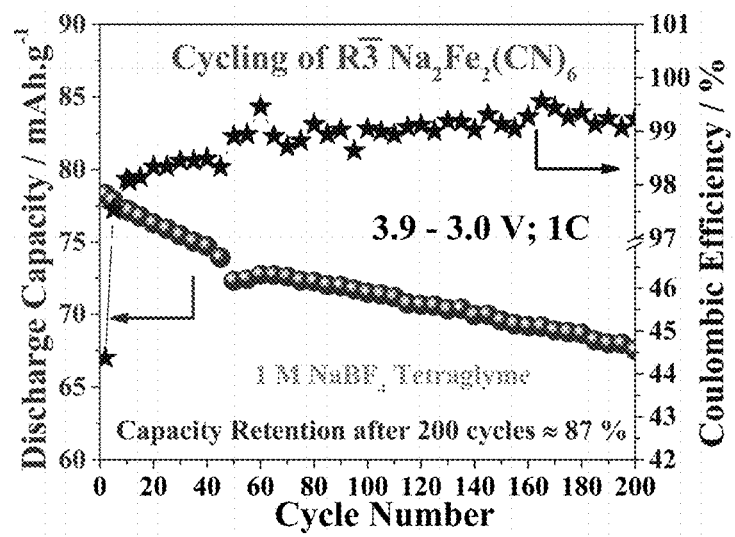

As a representative example of what the 3.9-3.0 V cycling curve of R—$Na_2Fe_2(CN)_6$ would look like, the tenth galvanostatic cycling of R—$Na_2Fe_2(CN)_6$ between 3.9-3.0 V vs Na/Na$^+$ at 1 C rate is depicted in FIG. 6B. Flat charge and discharge plateaus at an average voltage of 3.3 V can be seen with a discharge capacity of 78 mAh/g, which is much closer to the charge capacities of the graphite anode (89 mAh/g) and the $Na_2Ti_3O_7 \leftrightarrows Na_{3-x}Ti_3O_7$ pathway (74 mAh/g). This can therefore ensure a well-balanced full cell. Most importantly, the 3.9-3.0 V cycling of R—$Na_2Fe_2(CN)_6$ cathode was found to be similarly quite stable, with a capacity retention of 87% after 200 cycles along with a high stable coulombic efficiency above 99% (FIG. 6C).

Example 7

Cathode (M-$Na_2Fe_2(CN)_6 \cdot 2H_2O$ or R—$Na_2Fe_2(CN)_6$) and Anode (Graphite) Combinations in Full Cells for Non-Flammable NIBs, Using 1 M $NaBF_4$ in Tetraglyme Electrolyte To demonstrate the advantages of this electrolyte in a practically relevant NIB, two different types of full cell combinations were investigated. In both combinations, a graphite anode and 1 M $NaBF_4$ in tetraglyme electrolyte were used, while the cathode is made of either the M-$Na_2Fe_2(CN)_6 \cdot 2H_2O$ (FIG. 7A) or the R—$Na_2Fe_2(CN)_6$ when cycled between 3.9-3.0 V vs Na/Na$^+$ (FIG. 7B). For the R—$Na_2Fe_2(CN)_6$//graphite full cell, the cathode was made to cycle only within its upper voltage charge-discharge plateaus such that the lower charge plateau was used for coulombic inefficiency compensation of the full cell (as described in FIG. 6A).

For both full cells, no prior cycling of anode or cathode in half cells was conducted and all irreversibilities of the cathode and anode were accounted for by using a correspondingly heavier cathode. Despite this, a moderately high energy density of between 67 and 71 Wh/kg could be obtained for both types of full cells (taking into account the weights of the active materials in cathode and anode) along with stable cycling over 300 cycles, as shown in FIG. 7C. With further optimisation, an energy density approaching 87-89 Wh/kg and 75 Wh/kg could be expected for the R—$Na_2Fe_2(CN)_6$//graphite and the M-$Na_2Fe_2(CN)_6 \cdot 2H_2O$//graphite full cells respectively. These are quite attractive for grid storage battery applications, considering the low costs of the cathode, anode and electrolyte.

Example 8

Figure 8A:
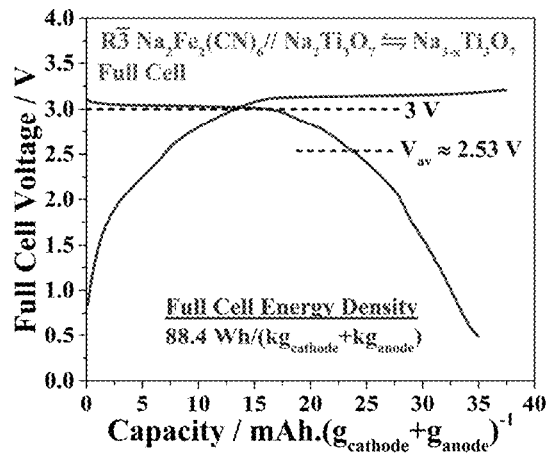
FIGS. 8A-8B depict.

Cathode (R—$Na_2Fe_2(CN)_6$) and Anode ($Na_2Ti_3O_7 \leftrightarrows Na_{3-x}Ti_3O_7$ Pathway) Combinations in Full Cells for Non-Flammable NIBs, Using 1 M $NaBF_4$ in Tetraglyme Electrolyte As another example of a viable non-flammable NIB, the R—$Na_2Fe_2(CN)_6$ with cycling at 3.9-3.0 V vs Na/Na$^+$ was made to function as the cathode, the $Na_2Ti_3O_7 \leftrightarrows Na_{3-x}Ti_3O_7$ pathway as the anode and the 1 M $NaBF_4$ in tetraglyme as the electrolyte. A representative C/2 galvanostatic cycling of such a full cell is as shown in FIG. 8A. Similar to the case for the R—$Na_2Fe_2(CN)_6$//graphite full cell, the lower charge plateau of R—$Na_2Fe_2(CN)_6$ was again used for coulombic inefficiency compensation in this full cell as well. Due to the 0.2 V charge plateau of the $Na_2Ti_3O_7 \leftrightarrows Na_{3-x}Ti_3O_7$ pathway and the 3.3 V upper discharge plateau of R—$Na_2Fe_2(CN)_6$, this full cell demonstrated a flat discharge plateau between 3.1-3 V and delivered a very attractive energy density of 89 Wh/kg (based on both cathode and anode weights) at an average voltage of 2.53 V without any pre-cycling steps.

Figure 8B:
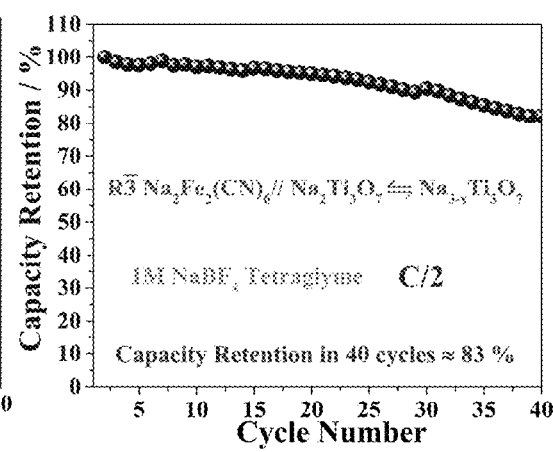

Such a R—$Na_2Fe_2(CN)_6$//$Na_2Ti_3O_7 \leftrightarrows Na_{3-x}Ti_3O_7$ full cell also displayed quite stable cycling over 40 cycles, as shown in FIG. 8B. With further optimisation, a full cell that can deliver an energy density exceeding 100 Wh/kg along with stable cycling as demonstrated by the cathode and anode in their respective half cells, can be expected.

Example 9

Performance of $Na_a[Cu_bFe_cMn_dNi_eTi_fM_g]O_2$ Cathode in 1 M $NaBF_4$ in Tetraglyme The performance of embodiments of metal oxide cathodes according to the above formula in 1 M $NaBF_4$ in tetraglyme was investigated. The metal oxide has a general formula $Na_a[Cu_bFe_cMn_dNi_eTi_fM_g]O_2$, where:

$0 \leq a \leq 1$; $0 \leq b \leq 0.3$; $0 \leq c \leq 0.5$; $0 \leq d \leq 0.6$; $0 \leq e \leq 0.3$; $0 \leq f \leq 0.2$; $0 \leq g \leq 0.4$, M can be selected from the following group: Mo, Zn, Mg, Cr, Co, Zr, Al, Ca, K, Sr, Li, H, Sn, Te, Sb, Nb, Sc, Rb, Cs, Na; and the values are chosen in such a way and in such stoichiometry so as to maintain charge balance.

Figure 9A:
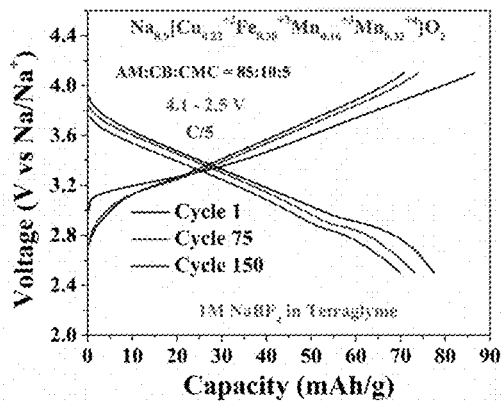
FIGS. 9A-9D depict.
Figure 9B:
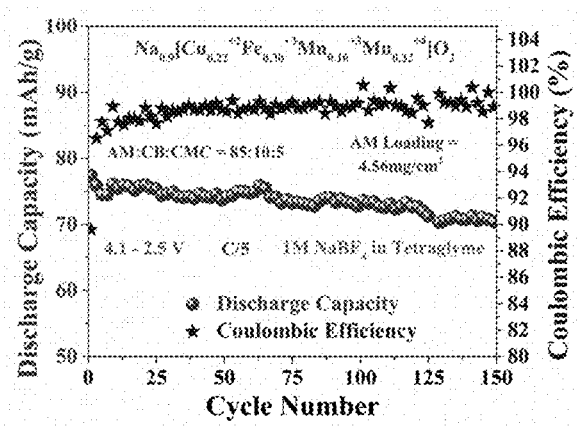

Two examples of such cathodes ($Na_{0.9}[Cu_{0.22}Fe_{0.30}Mn_{0.48}]O_2$ and $Na_{0.9}[Cu_{0.12}Ni_{0.10}Fe_{0.30}Mn_{0.43}Ti_{0.05}]O_2$) were demonstrated. FIG. 9A shows the cycling profiles of a $Na_{0.9}[Cu_{0.22}Fe_{0.30}Mn_{0.48}]O_2$ half-cell in 1 M $NaBF_4$ in tetraglyme electrolyte at C/5 rate cycled from 4.1-2.5 V vs $Na/Na^+$ and FIG. 9B shows the high coulombic efficiency (≈99%) and stable discharge capacity of the half-cell over 150 cycles.

Figure 9C:
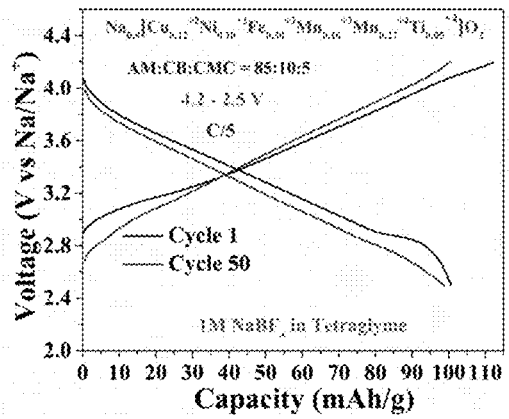
Figure 9D:
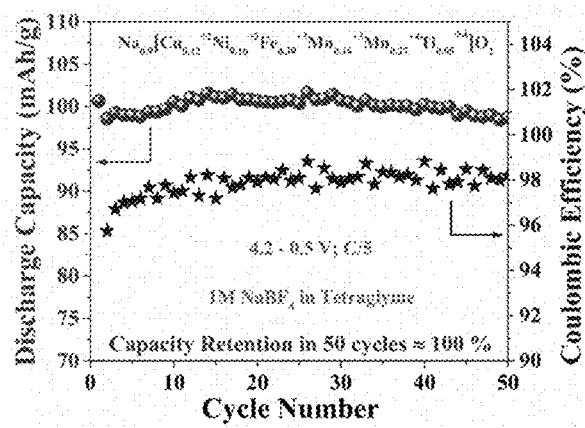

FIG. 9C shows the cycling profiles of a $Na_{0.9}[Cu_{0.12}Ni_{0.10}Fe_{0.30}Mn_{0.43}Ti_{0.05}]O_2$ half-cell in 1 M $NaBF_4$ in tetraglyme electrolyte at C/5 rate cycled from 4.2-2.5 V vs $Na/Na^+$ and FIG. 9D shows the high coulombic efficiency (≈98-99%) and stable discharge capacity of the half-cell over 50 cycles.

Example 10

Comparison of the Performance of Hard Carbon Anode in 1 M $NaBF_4$ in Tetraglyme and in 1 M $NaClO_4$ in EC-PC (1:1, v/v)

Figure 10A:
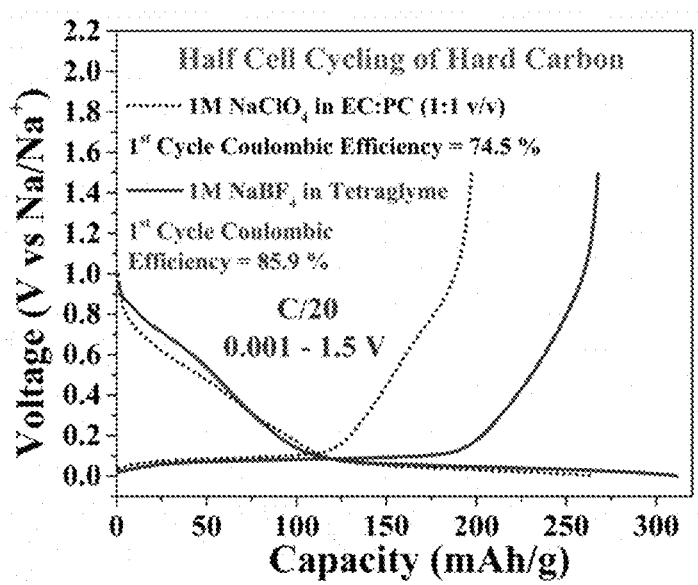
FIGS. 10A-10B depict.
Figure 10B:
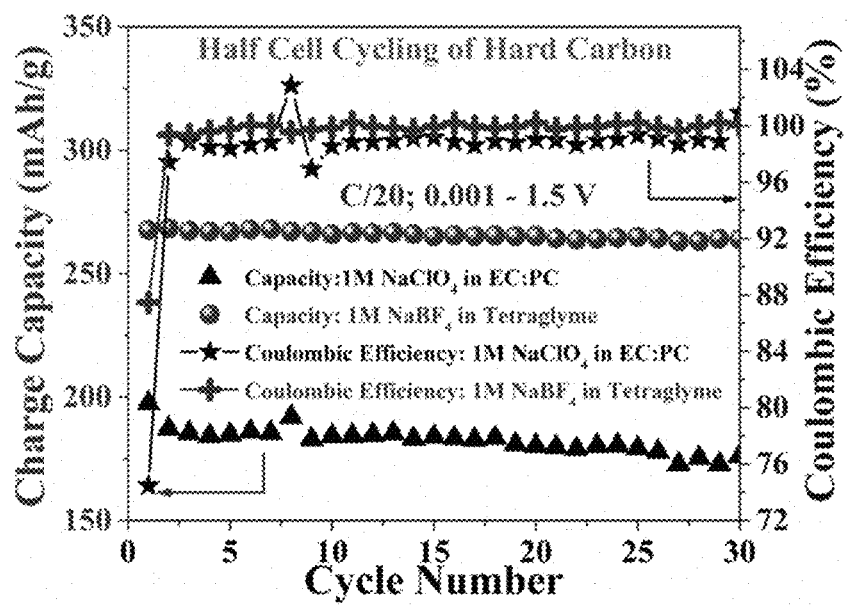

As shown in FIG. 10A, the hard carbon anode in 1 M $NaBF_4$ in tetraglyme gave higher charge capacity (268 mAh/g) than in 1 M $NaClO_4$ in EC-PC (197 mAh/g). In addition, FIG. 10B shows that the same anode in 1 M $NaBF_4$ in tetraglyme achieved a higher 1st cycle coulombic efficiency (85.9%) that than in 1 M $NaClO_4$ in EC-PC (74.5%), as well as higher cycling stability with higher average coulombic efficiency (99.9% vs 98.9%) in cycles 2-30.

Based on the above half-cell results, a NIB full cell utilising hard carbon anode in 1 M $NaBF_4$ in tetraglyme electrolyte would require less amount of cathode, therefore boosting the specific energy density of the full cell. This was demonstrated in examples 11 and 12 for a few different cathodes.

Example 11

Figure 11:
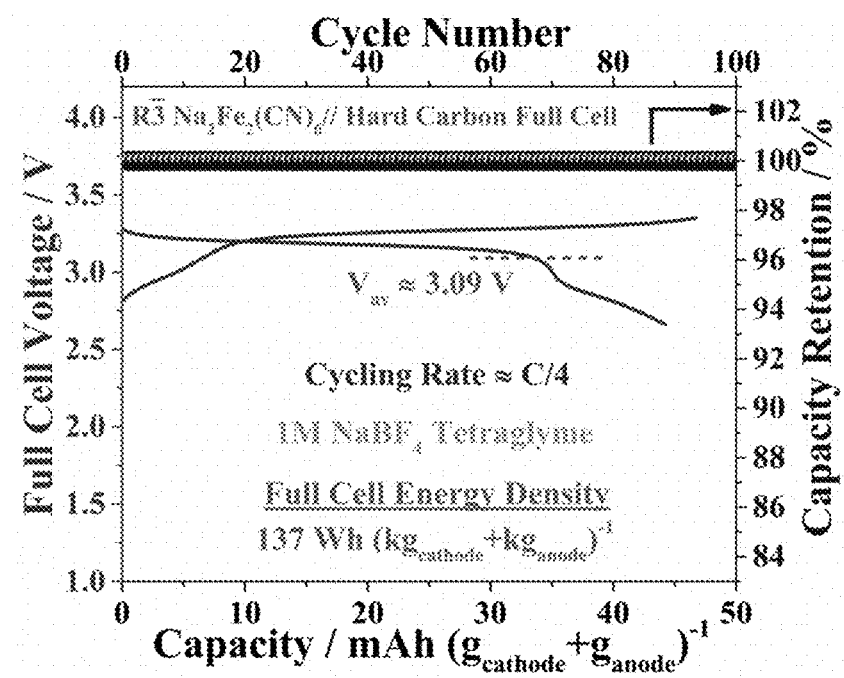
FIG. 11 depicts a representative cycling profile and long term cycling stability over 100 cycles for a R—Na$_2$Fe$_2$(CN)$_6$//hard carbon full cell using 1 M NaBF$_4$ in tetraglyme electrolyte at C/4 rate.

Cathode (R—$Na_2Fe_2(CN)_6$) and Anode (Hard Carbon) Combination in Full Cell for Non-Flammable NIB, Using 1 M $NaBF_4$ in Tetraglyme Electrolyte As demonstrated in FIG. 11, a R—$Na_2Fe_2(CN)_6$//hard carbon full cell delivered a high specific energy density of 137 Wh/kg with no decrease in capacity over 100 cycles. Hence, this R—$Na_2Fe_2(CN)_6$//hard carbon full cell combination can be another attractive candidate for commercial NIBs.

Example 12

Figure 12A:
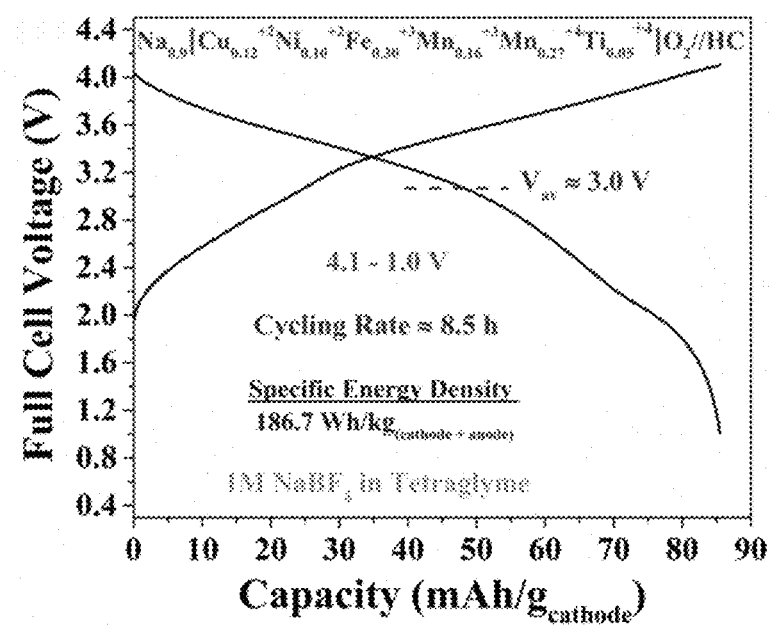
FIGS. 12A-12B depict.
Figure 12B:
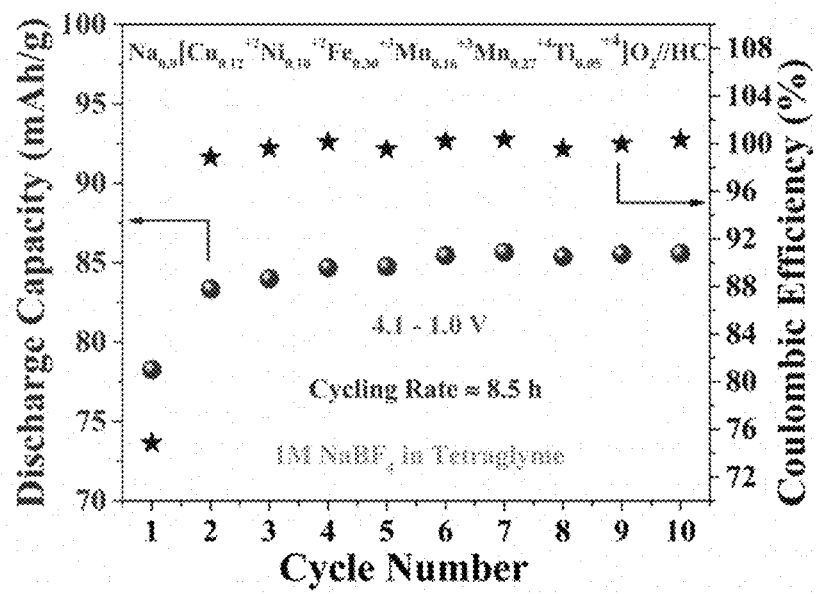

Cathode ($Na_{0.9}[Cu_{0.12}Ni_{0.10}Fe_{0.30}Mn_{0.43}Ti_{0.05}]O_2$) and Anode (Hard Carbon) Combination in Full Cell for Non-Flammable NIB, Using 1 M $NaBF_4$ in Tetraglyme Electrolyte A $Na_{0.9}[Cu_{0.12}Ni_{0.10}Fe_{0.30}Mn_{0.43}Ti_{0.05}]O_2$//hard carbon full cell could deliver a very high specific energy density approaching 187 Wh/kg with a stable coulombic efficiency of 100% in 10 cycles (FIG. 12B). With a very high specific energy density, such full cell combination would be attractive for many applications commercially. The high coulombic efficiency of the anode and cathode in the 1 M $NaBF_4$ in tetraglyme electrolyte contributed significantly to the high specific energy density and coulombic efficiency achieved.

Example 13

Non-Flammability and Thermal Stability of the Electrolytes

Figure 13D:
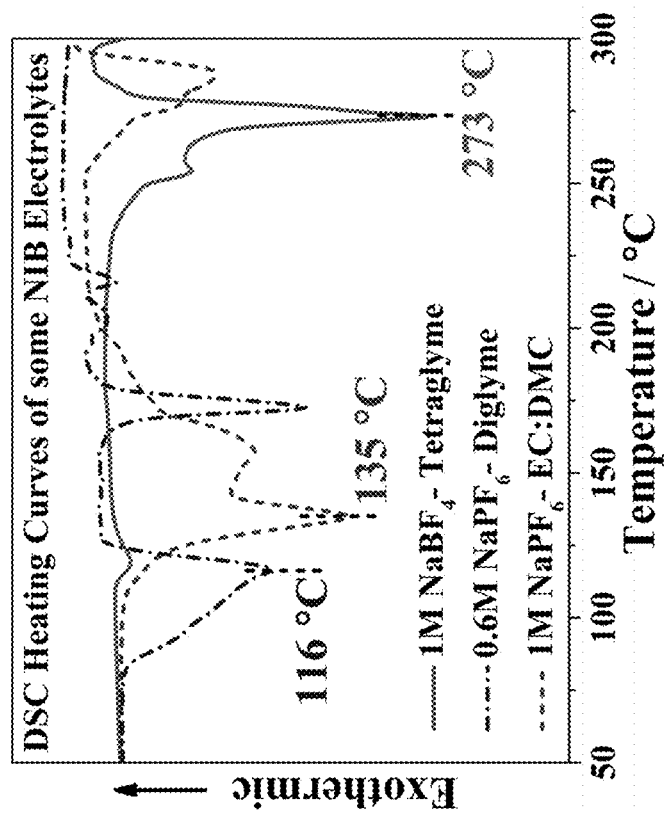
FIGS. 13A-13D depict flammability tests conducted in ambient air by exposing various electrolyte solutions to an open flame. The electrolyte solutions are.
Figures 13A, 13B, 13C:
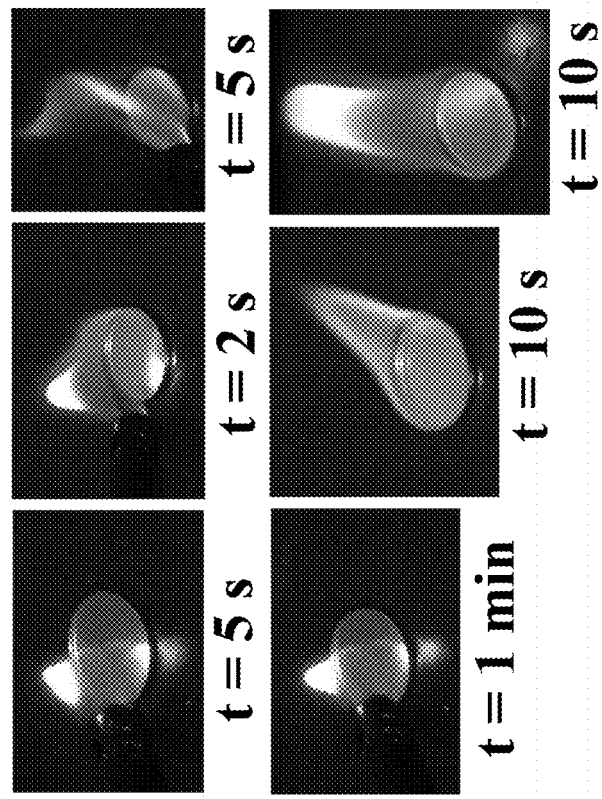

To demonstrate the non-flammability and thermal stability of the tetraglyme electrolyte, various electrolytes were continuously exposed to an open flame under ambient conditions throughout the exposure time. The 1 M $NaBF_4$ in tetraglyme electrolyte did not catch fire even after 1 min (60 s) of continuous exposure to an open flame (FIG. 13A). In contrast, the conventional electrolytes, such as the commercially available 1 M $NaPF_6$ in EC-DMC, based on the flammable DMC solvent, caught fire easily within 2 s of open flame exposure (FIG. 13B). Furthermore, other glyme based electrolytes were also found to be flammable. For example, the highly flammable diethylene glycol dimehtyl ether (diglyme) based electrolytes, which are currently the most commonly used glyme based NIB electrolytes, caught fire within 5 s of flame exposure (FIG. 13C demonstrates the flammability test for 0.6 M $NaPF_6$ in diglyme electrolyte solution).

These flammability test results were supported by Differential Scanning calorimetry (DSC) results on various conventionally used electrolytes. The corresponding DSC heating curves in an inert argon atmosphere (simulating the sealed conditions of NIBs) are presented in FIG. 13D. It can be seen that the 1 M $NaBF_4$ in tetraglyme electrolyte is the most thermally stable electrolyte, registering no major thermal events up till a high temperature of 273° C. In contrast, significant thermal events occurred at much lower temperatures of 135° C. for 1 M $NaPF_6$ in EC-DMC and at 116° C. for 0.6 M $NaPF_6$ in diglyme. These DSC and flammability test results provide direct evidence on the safe use of 1 M $NaBF_4$ in tetraglyme electrolyte and for the NIBs incorporating it as the electrolyte.

Conclusions

The results above, using 1M $NaBF_4$ in tetraglyme as an electrolyte highlight that this non-flammable electrolyte can function very well with both high voltage cathodes as well as low voltage anodes for NIBs.

Hence, it is expected that other known NIB cathodes and anodes would function when cycled with this electrolyte (as already indicated by the CV results shown in FIG. 1 which prove that this electrolyte's electrochemical stability window is from 0.0 V to at least 4-4.5 V vs $Na/Na^+$). In particular, $Na_3V_2(PO_4)_3$ (NVP) is another cathode that would function very well with 1M $NaBF_4$. in Tetraglyme electrolyte as NVP is also generally cycled between 3.9-2.0 V and has its charge/discharge plateaus around 3.4 V vs $Na/Na^+$, similar to that for R—$Na_2Fe_2(CN)_6$. Furthermore, a related mixed phosphate phase, $Na_4Mn_3(PO_4)_2(P_2O_7)$ may be another potential cathode that would be expected to function well with this electrolyte as it demonstrates a charge/discharge plateau centered around 4 V vs $Na/Na^+$ which is within the electrochemical stability limit of this electrolyte.

The invention claimed is:

1. A non-flammable sodium-ion battery comprising:
   a cathode for the sodium-ion battery;
   an anode for the sodium-ion battery;
   a separator; and
   an electrolyte comprising a salt and a glyme solvent selected from the group consisting of tetraglyme and an analogue thereof, wherein:
   the anode does not comprise lithium;
   the salt comprises $NaBF_4$;
   the $NaBF_4$ is provided at a concentration of from 0.5 M to 2.0 M in the glyme solvent;
   the battery has an average voltage of from 1.5 V to 6.0 V;
   the battery has a coulombic efficiency after 5 charge/discharge cycles of at least 97%; and
   the cathode and anode comprise active material pairs selected from the group consisting of:
   Zn-doped $Na_3V_2(PO_4)_3$ (NVP)//hard carbon, $Na_{0.9}[Cu_{0.12}Ni_{0.10}Fe_{0.30}Mn_{0.43}Ti_{0.05}]O_2$//hard carbon, and $Na_{0.9}[Cu_{0.12}Ni_{0.10}Fe_{0.30}Mn_{0.43}Ti_{0.05}]O_2$//graphite.

2. The battery according to claim 1, wherein the average voltage is from 1.75 to 5.5 V.

3. The battery according to claim 1, wherein the battery has a cycle life of from 50 cycles to 25,000 charge/discharge cycles.

4. The battery according to claim 1, wherein the electrolyte further comprises one or more solvents selected from the group consisting of a cyclic carbonate, a linear carbonate, a cyclic ester, a linear ester, a cyclic or linear ether other than a glyme, a nitrile, dioxolane or a derivative thereof, ethylene sulfide, sulfolane, and sultone or a derivative thereof.

5. The battery according to claim 4, wherein the electrolyte further comprises one or more solvents selected from the group consisting of propylene carbonate, ethylene carbonate, diethyl carbonate, dimethyl carbonate, ethyl methyl carbonate, tetrahydrofuran, sulfolane, and acetonitrile.

6. The battery according to claim 1, wherein the salt further comprises one or more salts selected from the group consisting of NaCN, $NaClO_4$, $NaAsF_6$, $NaPF_6$, $NaPF_{6-x}(C_nF_{2n+1})_x$ (1<x<6, n=1 or 2), NaSCN, NaBr, NaI, $Na_2SO_4$, $Na_2B_{10}Cl_{10}$, NaCl, NaF, $NaPF_4$, NaOCN, $Na(CF_3SO_3)$, $NaN(CF_3SO_2)_2$, $NaN(FSO_2)_2$, $NaN(C_2F_5SO_2)_2$, $NaN(CF_3SO_2)(C_4F_9SO_2)$, $NaC(CF_3SO_2)_3$, $NaC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phtalate, sodium stearyl sulfonate, sodium octyl sulfonate, and sodium dodecylbenzene sulfonate, optionally wherein the salt further comprises one or more salts selected from the group consisting of $NaClO_4$, $NaPF_6$, NaSCN, NaBr, NaI, NaCl, NaOCN, $Na(CF_3SO_3)$, $NaN(CF_3SO_2)_2$, and NaCN.

7. The battery according to claim 6, wherein each of the one or more salts of claim 6, when present, are provided in a concentration of greater than 0 to 2.5 M.

8. The battery according to claim 1, wherein the electrolyte further comprises an additive selected from one or more of the group consisting of fluoroethylene carbonate (FEC), vinylene carbonate (VC), vinyl ethylene carbonate (VEC), and adiponitrile.

9. The battery according to claim 1, wherein the analogue of tetraglyme is selected from the compounds where one or both of the —$CH_3$ end members in a tetraglyme molecule are modified to either —$C_2H_5$ or to —$CH_2CH_2Cl$.

10. The battery according to according to claim 1, wherein the cathode and anode comprise the active material pair.

11. The battery according to claim 1, wherein the cathode and anode comprise the active material pair $Na_{0.9}[Cu_{0.12}Ni_{0.10}Fe_{0.30}Mn_{0.43}Ti_{0.05}]O_2$//hard carbon.

12. The battery according to claim 1, wherein the cathode and anode comprise the active material pair $Na_{0.9}[Cu_{0.12}Ni_{0.10}Fe_{0.30}Mn_{0.43}Ti_{0.05}]O_2$//graphite.

* * * * *